United States Patent Office 3,238,215
Patented Mar. 1, 1966

3,238,215
1-[(3-, 2-, AND 1-INDOLYL)-LOWER-ALKYL-, LOWER-ALKENYL-, AND LOWER-ALKYNYL]PIPERIDINES
Bernard L. Zenitz, Colonie, N.Y., assignor to Sterling Drug Inc., New York, N.Y., a corporation of Delaware
No Drawing. Filed Oct. 17, 1963, Ser. No. 317,072
20 Claims. (Cl. 260—293)

This application is a continuation-in-part of my prior application Serial No. 119,805, filed June 27, 1961, now U.S. Patent 3,183,235, patented May 11, 1965.

This invention relates to the field of substituted indoles. The compounds of the invention are 1-[(3-, 2-, and 1-indolyl)-lower-alkyl-, lower-alkenyl-, and lower-alkynyl] piperidines, their acid-addition and quaternary ammonium salts, and to intermediates and processes for the preparation thereof.

The present invention resides in the concept of attaching to the 1-, 2-, or 3-position of indole, through an unsubstituted lower-alkylene bridge interposing from two to six carbon atoms between the indolyl group and the nitrogen atom of the piperidine ring, or a lower-alkenylene or lower-alkynylene bridge interposing from three to four carbon atoms between the indolyl group and the nitrogen atom of the piperidine ring, a 1-(piperidyl) group or a 1-(lower-alkylated-piperidyl) group further substituted in the piperidine ring by substituents of a nature to be more fully described hereinafter.

The structural embodiments of the invention are represented by the formulas

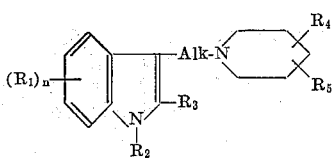

Ia

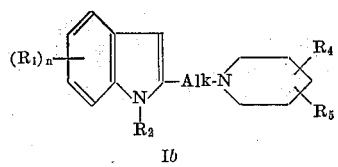

Ib

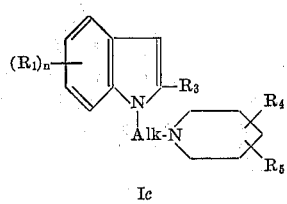

Ic and are thus represented by the composite formula

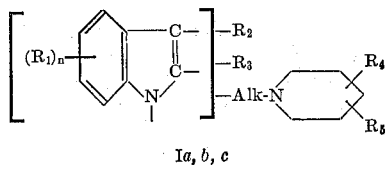

Ia, b, c where any one of the three free valences on the indole ring is taken up by the 1-[Alk]piperidine group and the valences at the 1- and 2-positions when not taken up by the 1-[Alk]piperidine group are taken up by the groups $R_2$ and $R_3$, respectively. In the above general Formulas Ia, b, and c, Alk represents lower-alkylene, or lower-alkenylene, or lower-alkynylene; $R_1$ represents from one to two members of the group consisting of hydrogen, hydroxy, halogen, (including fluorine, chlorine, bromine, and iodine), lower-alkoxy, methylenedioxy, lower-alkylmercapto, lower-alkylsulfonyl, lower-alkyl, trifluoromethyl, benzyloxy, and benzylthio; $R_2$ represents a member of the group consisting of hydrogen, lower-alkyl, and monocarbocyclic aryl-lower-alkyl; $R_3$ represents a member of the group consisting of hydrogen, lower-alkyl, and monocarbocyclic aryl; $R_4$ represents hydrogen or from one to five lower-alkyl radicals; $R_5$ represents a member of the group consisting of cycloalkyl, cycloalkyl-loweralkyl, monocarbocyclic aryl-lower-alkyl, carbo-loweralkoxy, unsubstituted-carbamyl, N-lower-alkylcarbamyl, N - lower - alkenylcarbamyl, N,N-di-lower-alkylcarbamyl, N,N - di - lower - alkenylcarbamyl, aminocarbamyl (hydrazido), N - lower - alkylaminocarbamyl (N-lower-alkylhydrazido), N-lower-alkylidenehydrazono, aminomethyl, N-lower-alkylaminomethyl, N-lower-alkenylaminomethyl, N,N-di-lower-alkylaminomethyl, N,N - di - lower-alkenylaminomethyl, N-lower-alkyl-amino, N,N-di-lower-alkylamino, N,N-di-lower-alkenylamino, and lower-alkanoylamino; and $n$ represents the integers 1 or 2.

In the above general Formulas Ia, b, and c, Alk represents lower-alkylene containing from two to seven carbon atoms and interposing from two to six carbon atoms between the indolyl group and the nitrogen atom of the piperidine ring, or it represents a lower-alkylene or lower-alkynylene group interposing from three to four carbon atoms between the indolyl group and the nitrogen atom of the piperidine ring. The lower-alkylene, lower-alkenylene, and lower-alkynylene groups can be straight or branched and thus represent, inter alia, 1,2-ethylene [—CH₂CH₂—], 1,3-propylene [—CH₂CH₂CH₂—], 1,2-(1-methylethylene) [—CH(CH₃)CH₂—], 1,2-(2-methylethylene)

[—CH₂CH(CH₃)—]

1,4-butylene [—CH₂CH₂CH₂CH₂—], 1,3 - (1 - methylpropylene) [—CH(CH₃)CH₂CH₂—], 1,2-(1-ethylethylene) [—CH(C₂H₅)CH₂—], 1,5-pentylene

[—CH₂CH₂CH₂CH₂CH₂—]

1,4 - (3 - methylbutylene) [—CH₂CH₂CH(CH₃)CH₂—], 1,4-(2,4-dimethylbutylene)

[—CH(CH₃)CH₂CH(CH₃)CH₂—]

1,3-propenyl [—CH=CHCH₂—], 1,3-(1-butenyl)

[—CH=CHCH(CH₃)—]

1,4-butynyl [—CH₂C≡CCH₂—], and the like.

In the above general Formulas I$a$, $b$, and $c$, $R_1$ represents from one to two members of the group consisting of hydrogen, hydroxy, halogen (including fluorine, chlorine, bromine, and iodine), lower-alkoxy, methylenedioxy, lower-alkylmercapto, lower-alkylsulfonyl, lower-alkyl, trifluoromethyl, benzyloxy, or benzylthio. When $R_2$ represents two of said groups, the groups may be the same or different and can occupy any of the four available positions on the benzene ring. When $R_1$ represents lower-alkoxy, lower-alkylmercapto, lower-alkylsulfonyl, or lower-alkyl, the lower-alkyl moiety of said groups can contain from one to about four carbon atoms and can be either straight or branched. $R_1$ thus represents, inter alia, methoxy, ethoxy, 2-propoxy, methylcercapto, ethylmercapto, 2-butylmercapto, methylsulfonyl, ethylsulfonyl, 2-butylsulfonyl, methyl, ethyl, n-butyl, and the like.

In the above general Formulas I$a$, $b$, and $c$, when $R_2$ or $R_3$ represent lower-alkyl, the lower-alkyl group can contain from one to about four carbon atoms and can be either straight or branched. $R_2$ and $R_3$ each thus represent, inter alia, methyl, ethyl, isopropyl, n-butyl, and the like.

When $R_3$ represents monocarbocyclic aryl or when $R_2$ represents monocarbocyclic aryl-lower-alkyl, the monocarbocyclic aryl moiety thereof represents phenyl or phenyl substituted by one or more substituents such as, for example, halogen (including fluorine, chlorine, bromine, and iodine), lower-alkyl, hydroxy, lower-alkoxy, methylenedioxy, lower-alkylmercapto, lower-alkylsulfinyl, lower-alkylsulfonyl, and the like. When the monocarbocyclic aryl moiety is substituted by more than one of the above substitutents, the substituents can be the same or different and can occupy any of the available positions on the phenyl ring. When the substituent is a lower-alkyl, lower-alkoxy, lower-alkylmercapto, lower-alkylsulfinyl, or lower-alkylsulfonyl group, said substituents can be either straight or branched and can contain from one group contains from one to two carbon atoms. Thus $R_2$ represents benzyl or phenethyl and $R_2$ represents phenyl, or each of such groups substituted in the phenyl ring by one or more of such substituents, inter alia, as fluoro, chloro, bromo, iodo, methyl, isobutyl, hydroxy, methoxy, n-butoxy, methylenedioxy, methylmercapto, isopropylmercapto, methylsulfinyl, isopropylsulfinyl, methylsulfonyl, isopropylsulfonyl, and the like.

In the general Formulas I$a$, $b$, and $c$, $R_4$ represents hydrogen or from one to five lower-alkyl radicals. When $R_4$ represents one or more lower-alkyl radicals, each lower-alkyl radical can contain from one to about four carbon atoms, can be straight or branched and can occupy any of the five available positions on the piperidine ring, and when $R_4$ represents more than one lower-alkyl radical, said lower-alkyl radicals can be the same or different and can occupy the same or different positions on the piperidine ring. Thus $R_4$ represents, inter alia, methyl, ethyl, isopropyl, n-butyl, isobutyl, and the like.

When $R_5$ represents N-lower-alkylamino, N,N-di-lower-alkylamino, N,N-di-lower-alkenylamino, or lower-alkanoylamino, said radicals can occupy either the 3- or 4-positions of the piperidine ring. When $R_5$ represents cycloalkyl, cycloalkyl-lower-alkyl, monocarbocyclic aryl-lower-alkyl, carbo-lower-alkoxy, substituted carbamyl, N-lower-alkylcarbamyl, N-lower-alkenylcarbamyl, N,N-di-lower - alkylcarbamyl, N,N-di-lower-alkenylcarbamyl, aminocarbamyl, N-lower-alkylaminocarbamyl, N-lower-alkylidenehydrazono, aminomethyl, N-lower-alkylaminomethyl, N-lower-alkenylaminomethyl, N,N-di-lower-alkylaminomethyl, or N,N-di-lower-alkenylaminomethyl, said radicals can occupy any of the three available positions of the piperidine ring.

When $R_5$ represents a lower-alkanoylamino radical, the lower-alkanoyl portion of said radical can be either straight or branched and can contain from one to about six carbon atoms. $R_5$ thus also stands, inter alia, for formylamino, acetylamino, propionylamino, α-ethylbutyrylamino, and the like.

When $R_5$ represents cycloalkyl or cycloalkyl-lower-alkyl, the cycloalkyl moiety contains from five to seven ring carbon atoms, and the lower-alkyl moiety contains from one to two carbon atoms. Thus the cycloalkyl-lower-alkyl radical includes such radicals as cyclopentylmethyl, cyclohexyl, cyclohexylmethyl, 2-(cyclohexyl)ethyl, cycloheptylmethyl, and the like.

When $R_5$ represents a carbo-lower-alkoxy radical, it represents a radical of the formula COOR' where R' is a lower-alkyl group having from one to about six carbon atoms. Thus the carbo-lower-alkoxy radical includes such radicals, inter alia, as carbomethoxy, carboethoxy, carbopropoxy, carboisopropoxy, carbobutoxy, carbohexoxy, and the like.

When $R_5$ represents a monocarbocyclic aryl-lower-alkyl radical, the monocarbocyclic aryl moiety can be phenyl or phenyl substituted by one or more substituents selected from the group consisting of halogen (including fluorine, chlorine, bromine, and iodine), lower-alkyl, hydroxy, lower-alkoxy, methylenedioxy, lower-alkylmercapto, lower-alkylsulfinyl, lower-alkylsulfonyl, amino, and lower-alkanoylamino, and the lower-alkyl moiety contains from one to two carbon atoms. When the monocarbocyclic aryl moiety is substituted by more than one of the above substituents, the substituents can be the same or different and can occupy any of the available positions on the benzene ring. When the substituent is lower-alkyl lower-alkoxy, lower-alkylmercapto, lower-alkylsulfinyl, lower-alkylsulfonyl, or lower-alkanoylamino, said substituents can be either straight or branched and can contain from one to about four carbon atoms. Thus $R_5$ also stands, inter alia, for benzyl, 2-(4-fluorophenyl)ethyl, 2-(4-chlorophenyl)ethyl, 2-(4-bromophenyl)ethyl, 2-(4-iodophenyl) ethyl, 3-methylbenzyl, 4-hydroxybenzyl, 4-methoxybenzyl, 3,4-methylenedioxybenzyl, 4-methylmercaptobenzyl, 4-methylsulfinylbenzyl, 4-methylsulfonylbenzyl, 2-(4-aminophenyl)ethyl, 2-(4-acetylaminophenyl)ethyl, and the like.

When $R_5$ represents N-lower-alkylcarbamyl, N,N-di-lower-alkylcarbamyl, N-lower-alkylaminocarbamyl, N-lower-alkylaminomethyl, N,N-di-lower-alkylaminomethyl, N-lower-alkylamino, or N,N-di-lower-alkylamino, the alkyl moiety in each of said radicals can contain from one to about four carbon atoms and can be either straight or branched. Thus $R_5$ also represents, inter alia, N-methylcarbamyl, N-ethylcarbamyl, N-butylcarbamyl, N,N-dimethylcarbamyl, N,N-diethylcarbamyl, N,N-dibutylcarbamyl, N-ethylaminocarbamyl, N-isopropylaminocarbamyl, N-methylaminomethyl, N-ethylaminoethyl, N-butylaminomethyl, N,N-dimethylaminomethyl, N,N-diethylaminomethyl, N-methylamino, N-ethylamino, N,N-dimethylamino, N,N-diethylamino, or N,N-dibutylamino.

When $R_5$ represents N-lower-alkenylcarbamyl, N,N-di-lower-alkenylcarbamyl, N-lower-alkylidenehydrazono, N-lower - alkenylaminomethyl, N,N-di-lower-alkenylaminomethyl, or N,N-di-lower-alkenylamino, the lower-alkenyl or lower-alkylidene moiety of said radicals can contain from three to four carbon atoms and can be straight or branched. Thus $R_5$ also stands, inter alia, for N-2-propenylcarbamyl, N-2-methyl-2-propenylcarbamyl, N,N-di-(2 - propenyl)carbamyl, N,N-di-(2-methyl-2-propenyl) carbamyl, 2-propylidenehydrazono, N-2-propenylaminomethyl, N-2-methyl-2-propenylaminomethyl, N,N-di-(2-propenyl)aminomethyl, N,N - di-(3-methyl-2-propenyl) aminomethyl, or N,N-dipropenylamino.

The compounds of Formulas I$a$, $b$, and $c$ where $R_5$ is cycloalkyl, cycloalkyl-lower-alkyl, monocarbocyclic aryl-lower-alkyl, aminomethyl, N-lower-alkylaminomethyl, N-lower - alkenyl-aminomethyl, N,N-di-lower-alkylaminoyl, N,N-di-lower-alkenylaminomethyl, N-lower-alkylamino, N,N-di-lower-alkylamino, or N,N-di-lower-alkenylamino are prepared by reacting, with an alkali metal aluminum hydride, a respective 1-[(3-, 2-, or 1-indolyl)-lower-alkanoyl or lower-alkenoyl]piperidine having the formulas

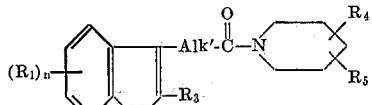

IIa

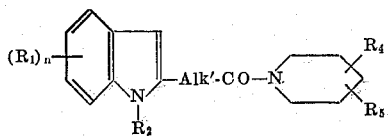

IIb

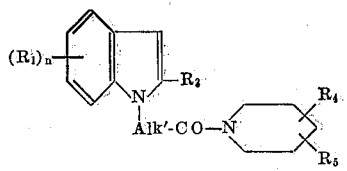

IIc and which are thus represented by the composite formula

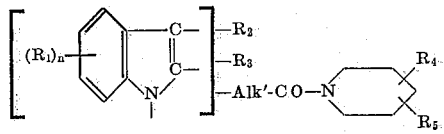

where any one of the three free valences on the indole ring is taken up by the 1-[-lower-alkanoyl or alkenoyl]piperidine group and the valences at the 1- and 2-positions, when not taken up by the 1-[lower-alkanoyl or alkenoyl]piperidine group, are taken up by the groups $R_2$ and $R_3$, respectively, and where $R_1$, $R_2$, $R_3$, $R_4$ and $n$ have the meanings given above, Alk' is either lower-alkylene containing from one to six carbon atoms and interposing from one to five carbon atoms between the indolyl group and the carbonyl carbon atom of the lower-alkanoyl group, or lower-alkenylene interposing from two to three carbon atoms between the indolyl group and the carbonyl carbon atom of the lower-alkenoyl group, and $R_5$ is cycloalkyl, cycloalkyl-lower-alkyl, monocarbocyclic aryl-lower-alkyl, carbo-lower-alkoxy, unsubstituted-carbamyl, N-lower-alkylcarbamyl, N-lower-alkenyl-carbamyl, N,N-di-lower-alkylcarbamyl, N,N-di-lower-alkenyl-carbamyl, N,N-di-lower-alkylaminomethyl, N,N-di-lower-alkenylaminomethyl, lower-alkanoylamino, N,N-di-lower-alkylamino, or N,N-di-lower-alkenylamino. The reaction is carried out at a temperature in the range from about 0° C. to about 65° C. in an organic solvent inert under the conditions of the reaction. It is preferred to use lithium aluminum hydride.

The intermediate 3-, 2-, and 1-indolyl-lower-alkanoyl- and lower-alkenoyl-amines of Formulas IIa, b, and c above are prepared by reacting a 3-, 2-, or 1-indolyl-lower-alkanoic acid or a 3-, 2-, or 1-indolyl-lower-alkenoic acid with a lower-alkyl haloformate in the presence of an acid acceptor, for example triethylamine, at a temperature between about —20° C. and 20° C. to give a mixed anhydride of a lower-alkyl carbonic acid and the 3-, 2-, or 1-indolyl-lower-alkanoic acid or the 3-, 2-, or 1-indolyl-lower-alkenoic acid. The latter have the Formulas VIIa, b, and c

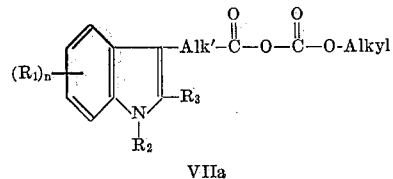

VIIa

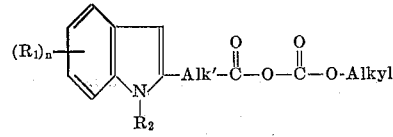

VIIb

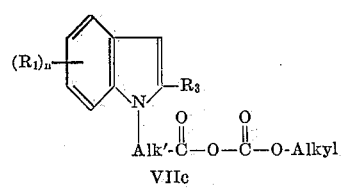

VIIc and thus are represented by the composite formula

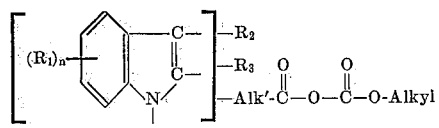

where any one of the three free valences on the indole ring is taken up by the Alk'—COO—COO—Alkyl group and the valences at the 1- and 2-positions, when not taken up by the Alk'—COO—COO—Alkyl group, are taken up by the groups $R_2$ and $R_3$, respectively, and where $R_1$, $R_2$, $R_3$, $R_4$, Alk', and $n$ have the meanings given above and Alkyl represents lower-alkyl containing from one to about five carbon atoms. The reaction is preferably carried out in an organic solvent inert under the conditions of the reaction such as anhydrous acetone, ether, ethylene dichloride, and the like. Acetone is the preferred solvent. The purpose of the acid-acceptor is to take up the hydrogen halide split out during the course of the reaction and is a basic substance which forms water-soluble by-products easily separable from the product.

The indolyl-lower-alkane mixed anhydrides of the (1-, 2-, and 3-indolyl)-lower-alkanoic and lower-alkenoic acids of Formulas VIIa, b, and c thus formed in situ are reacted with an appropriate piperidine or lower-alkylated-piperidine at a temperature between about —20° C. and about 20° C. to give the 1-[(3-, 2-, and 1-indolyl)-lower-alkanoyl]piperidines and 1-[(3-, 2-, and 1-indolyl)-lower-alkenoyl]piperidines of Formulas IIa, b, and c.

The 3-indolyl-lower-alkanoic acids which are used to prepare the mixed anhydrides of Formula VII have the formula

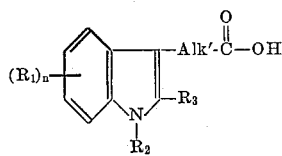

where $R_1$, $R_2$, $R_3$, Alk', and $n$ have the meanings given above. These acids, in addition to being useful as intermediates in the preparation of the mixed anhydrides of Formula VII also have utility in their own right as pharmacological agents which produce central nervous system effects manifest either as a stimulating or depressant action depending upon the dose and the base line behavioral state of the animal species.

They are prepared by the Fischer indole synthesis from an appropriate phenylhydrazone of an α-ketodicarboxylic acid ester or half ester. The latter have the formula:

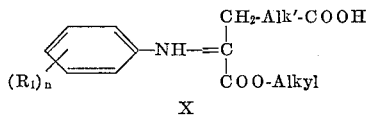

X where $R_1$, Alk′, and $n$ have the meanings given above and Alkyl is lower-alkyl. They are conveniently prepared by reaction of an appropriate phenyl diazonium chloride with an appropriate 2-carbo-lower-alkoxycycloalkanone followed by hydrolysis with aqueous sodium carbonate of the resulting 2-carbo-lower-alkoxy-2-(benzeneazo)cycloalkanone.

The compounds of Formula X thus prepared are then cyclized under conditions of the Fischer indole synthesis to give compounds of Formula IX where $R_2$ is a hydrogen atom and $R_3$ is a carboxylic acid group. Decarboxylation of the latter over a copper-quinoline mixture affords the corresponding compounds of Formula IX where $R_3$ is a hydrogen atom.

Alternatively the compounds of Formula IX where $R_3$ is a hydrogen atom or a lower-alkyl group, are prepared by alkylation of an appropriate indole magnesium halide (prepared by reacting the indole with a lower-alkyl magnesium halide) with an ω-halo-lower-alkyl nitrile and hydrolysis of the resulting 3-indolyl-lower-alkyl nitrile.

The compounds of Formula Ia where Alk is the 1,2-ethylene group (—$CH_2CH_2$—), $R_2$ is hydrogen, and $R_5$ is cycloalkyl, cycloalkyl-lower-alkyl, monocarbocyclic aryl-lower alkyl, aminomethyl, N-lower-alkylaminomethyl, N-lower-alkenylaminomethyl, N,N-di-lower-alkylaminomethyl, N,N-di - lower-alkenylaminomethyl, N-lower-alkylamino, N,N-di-alkylamino, or N,N-di-lower-alkenylamino are prepared by reacting, with an alkali metal aluminum hydride, a respective 1-[(3-indolyl)glyoxalyl]piperidine or 1-[(3-indolyl)glyoxalyl]-lower-alkylated-piperidine having the formula

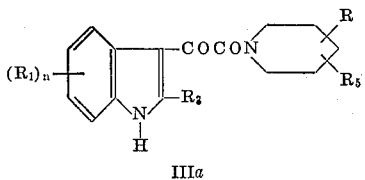

IIIa where $R_1$, $R_3$, $R_4$, and $n$ have the meanings given above and $R_5$ is cycloalkyl, cycloalkyl-lower-alkyl, monocarbocyclic aryl-lower-alkyl, unsubstituted-carbamyl, N-lower-alkylcarbamyl, N-lower-alkenylcarbamyl, N,N-di-lower-alkylcarbamyl, N,N-di - lower - alkenylcarbamyl, N,N-di-lower alkylaminomethyl, N,N-di-lower-alkenyl-aminomethyl, N-lower-alkanoylamino, N,N-di-lower-alkylamino, or N,N-di-lower-alkenylamino. The reaction is carried out at a temperature in the range from about 0° C. to about 65° C. in an organic solvent inert under the conditions of the reaction. It is preferred to use lithium aluminum hydride.

The intermediate glyoxamides of Formula IIIa are prepared by reacting an indole with a glyoxalyl halide at a temperature in the range from about —20° C. to 25° C. in an organic solvent inert under the conditions of the reaction, such as ether, petroleum ether, dioxane, tetrahydrofuran, and the like thus affording the 3-indolylglyoxalyl halides of formula IVa. The latter are then reacted with a piperidine or lower-alkylated-piperidine of Formula V at a temperature in the range from about —5° C. about 65° C. in the presence of an acid-acceptor to give the 1-[3-indolyl)glyoxalyl]piperidines or 1-[(3-indolyl)glyoxalyl]-lower-alkylated-piperidines of Formula IIIa. The reaction is represented by the equation:

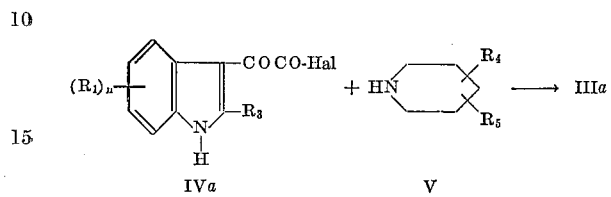

where $R_1$, $R_3$, $R_4$, R·, and $n$ have the meanings given above, and Hal represents halogen. The reaction is preferably carried out in an organic solvent inert under the conditions of the reaction, for example tetrahydrofuran, ether, ethylene dichloride, and the like. The purpose of the acid-acceptor is to take up the hydrogen halide which is split out during the course of the reaction. The acid-acceptor is a basic substance which forms water-soluble by-products easily separable from the main product of the reaction and includes such substances as alkali metal salts of weak acids, e.g. sodium carbonate, sodium bicarbonate, potassium carbonate, sodium acetate, and the like. The acid-acceptor can also be in the form of an excess quantity of the piperidine or lower-alkylated-piperidine. A preferred solvent is tetrahydrofuran, and it is preferred to use an excess quantity of the piperidine or lower-alkylated-piperidine as the acid-acceptor.

When $R_5$ in the compounds of formulas IIa, b, and c and IIIa is a non-reducible group, for example cycloalkyl, cycloalkyl-lower-alkyl, monocarbocyclic aryl-lower-alkyl, N, N-di-lower-alkylamino, or N,N-di-lower-alkenylamino, the respective compounds of formula Ia, b, or c are produced in which the group $R_5$ remains unchanged in the reaction. But when $R_5$ in the compounds of Formulas IIa, b, and c, of Formula IIIa is a reducible group, the $R_5$ is reduced simultaneously with the alkanoyl or alkenoyl carbonyl group or the glyoxalyl group thus producing products of Formulas Ia, b, and c in which the piperidyl group is substituted by the group $R_5$ in a reduced state. In such cases an additional amount of the alkali metal aluminum hydride must be used in the reaction mixture to insure the complete reduction of both the $R_5$ substituent and the carbonyl groups of the lower-alkanoyl, lower-alkenoyl, or glyoxalyl radicals. Thus a one molar equivalent of an alkali metal aluminum hydride, in addition to the one molar equivalent required to reduce the lower-alkanoyl or lower-alkenoyl carbonyl group or the two molar equivalents required to reduce the glyoxalyl group, would reduce the unsubstituted-carbamyl group to the aminomethyl group, an N-lower-alkylcarbamyl group to an N-lower-alkylaminomethyl group, an N-lower-alkenylcarbamyl group to an N-lower-alkenylaminomethyl group, an N,N-di-lower-alkylcarbamyl group to an N,N-di-lower-alkylaminomethyl group, an N,N-di-lower-alkenylcarbamyl group to an N, N-di-lower-alkenyl-aminomethyl group, or a lower-alkanoylamino group to an N-lower-alkylamino group.

The compounds of Formulas Ia, b, and c where $R_5$ is cycloalkyl, cycloalkyl-lower-alkyl, monocarbocyclic aryl-lower-alkyl, carbo-lower-alkoxy, unsubstituted-carbamyl, N-lower-alkylcarbamyl, N-lower-alkenylcarbamyl, N,N-di-lower-alkylcarbamyl, N,N-di-lower - alkenylcarbamyl, N-lower-alkylidenehydrazono, or lower-alkanoylamino and Alk is lower-alkylene are prepared by reacting a (1-, 2-, or 3-indolyl)-lower-alkyl halide (Formulas VIa, b, and c below) with the appropriate substituted-piperidine or lower-alkylated-piperidine (Formula V) at a temperature between about 50° C. and 150° C. in the presence of an acid-acceptor. The reaction is represented by the following equation:

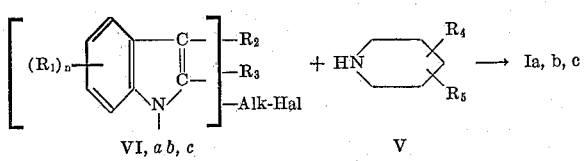

where $R_1$, $R_2$, $R_3$, $R_4$, $R_5$, $n$, and Alk have the meanings given above, and Hal is halogen.

The reaction is preferably carried out in an organic solvent, inert under the conditions of the reaction, for example anhydrous ethanol, benzene, xylene, and the like. The purpose of the acid-acceptor is to take up the hydrogen halide which is split out during the course of the reaction. The acid-acceptor is a basic substance which forms water-soluble by-products easily separable from the main product of the reaction and includes such substances as alkali metal salts of weak acids, e.g., sodium carbonate, sodium bicarbonate, potassium carbonate, sodium acetate, sodium alkoxides, and the like. The acid-acceptor can also be in the form of an excess quantity of the piperidine or lower-alkylated-piperidine.

The compounds of Formula Ia where $R_2$ is a hydrogen atom, Alk is lower-alkylene, and $R_5$ is cycloalkyl, cycloalkyl-lower-alkyl, monocarbocyclic aryl-lower-alkyl unsubstituted-carbamyl, N-lower-alkylcarbamyl, N-lower-alkenylcarbamyl, N,N-di-lower-alkylcarbamyl, N,N-di-lower-alkenylcarbamyl, N,N-di-lower-alkylaminomethyl, N, N-di-lower-alkenylaminomethyl, N,N-di-lower-alkylamino, or N,N-di-lower-alkenylamino are also prepared by reacting phenylhydrazine or an appropriately substituted-phenylhydrazine with a 1-(ω-formyl-lower-alkyl)-substituted-piperidine, or a 1-(ω-lower-alkanoyl-lower-alkyl)-substituted-piperidine, or a 1-(ω-monocarbocyclic aroyl-lower-alkyl)-substituted-piperidine. The reaction is represented by the following equations:

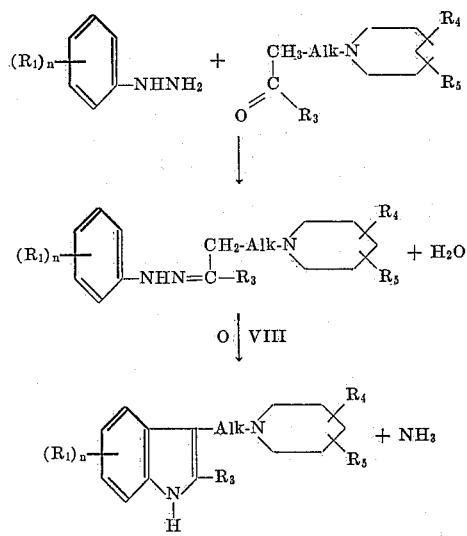

The reaction, known as the Fischer indole reaction, takes place in two steps with the formation of the hydrazone of Formula VIII occurring in the first step. The hydrazone then rearranges, under the conditions of the reaction, with loss of a molecule of ammonia to form the compounds of Formula Ia.

The reaction is carried out at a temperature in the range from about 20° C. to about 150° C. in an organic solvent inert under the conditions of the reaction, for example, ethanol, methanol, isopropanol, glacial acetic acid, and the like, in the presence of an acid catalyst, for example, sulfuric acid, hydrochloric acid, glacial acetic acid, zinc chloride, cuprous chloride, or boron trifluoride.

The compounds of Formula Ia, where Alk is lower-alkynylene are prepared by reacting a 3-propynylindole with formaldehyde and an appropriate substituted-piperidine or lower-alkylated-piperidine in an organic solvent inert under the conditions of the reaction, for example dioxane, benzene, ethanol and the like, at a temperature between 50° C. and 150° C. The reaction is represented by the equation:

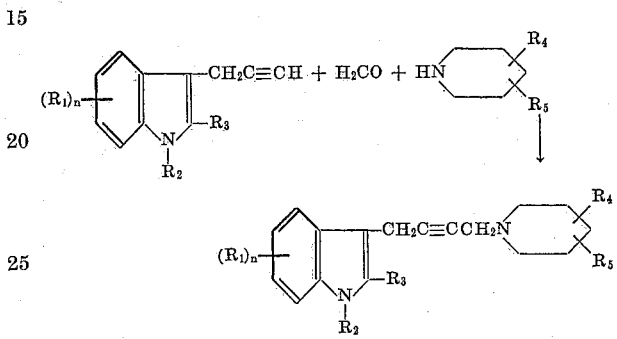

The compounds of Formulas Ia, b, and c; IIa, b, and c; and IIIa where $R_5$ is aminocarbamyl (hydrazido) are prepared by reacting the respective compounds of Formulas Ia, b, and c; IIa, b, and c; and IIIa, where $R_5$ is carbo-lower-alkoxy with a molar excess of hydrazine hydrate at a temperature in the range from about 80° C. to about 120° C. Although it is preferred to use 100% hydrazine hydrate, aqueous solutions of hydrazine hydrate can also be used successfully, for example, commercially available 80% solutions.

The compounds of Formulas Ia, b, and c; IIa, b, and c; and IIIa where $R_5$ is N-lower-alkylidine hydrazono are prepared by reacting the respective compounds of Formulas Ia, b, and c; IIa, b, and c; and IIa where $R_5$ is aminocarbamyl (hydrazido) with a lower-aliphatic aldehyde or di-lower-alkyl ketone at a temperature in the range from about 50° C. to about 150° C.

The compounds of Formulas Ia, b, and c; IIa, b, and c; and IIIa where $R_5$ is N-lower-alkylaminocarbamyl are prepared by reducing with hydrogen over a catalyst the respective compounds of Formulas Ia, b, and c; IIa, b, and c; and IIa where $R_5$ is N-lower-alkylidene hydrazono. The reaction is carried out in an organic solvent inert under the conditions of the reaction, for example methanol, ethanol, isopropanol, and the like, at a temperature in the range from about 25° C. to about 75° C. and at hydrogen pressures in the range from about 50–70 pounds p.s.i. A preferred catalyst is platinum oxide.

The indolyl-lower-alkyl halides of Formulas VIa, b, and c where Alk is a 1,2-ethylene group, used as intermediates in the method described above, are prepared by reduction of a 1-, 2-, or 3-indolyl-lower-alkanoic acid with lithium aluminum hydride and conversion of the resulting alcohol to the corresponding halide by reacting the former with, for example, a phosphorous trihalide or a thionyl halide.

The indolyl-lower-alkyl halides where the lower-alkylene chain, Alk, contains more than two linear carbon atoms are advantageously prepared by reacting the corresponding 1-, 2-, or 3-indolyl-lower-alkanols with a p-toluenesulfonyl halide. The reaction is carried out by reacting the indolyl-lower-alkanol with the p-toluenesulfonyl halide in a pyridine solution at a temperature in the range from −5° C. to 15° C.

The novel compounds of the instant invention are the compounds of Formulas Ia, b, and c and the acid-addition and quaternary ammonium salts thereof. The compounds of Formulas Ia, b, and c in free base form are converted to the acid-addition salt form by interaction of the base with an acid. In like manner, the free bases can be regenerated from the acid-addition salt form in the conventional manner, that is, by treating the salts with strong aqueous bases, for example alkali metal hydroxides, alkali metal carbonates, and alkali metal bicarbonates. The bases thus regenerated can then be interacted with the same or a different acid to give back the same or a different acid-addition salt. Thus the novel bases and all of their acid-addition salts are readily inter-convertible.

It will thus be appreciated that each of Formulas Ia, b, and c not only represents the structural configuration of the bases of Formulas Ia, b, and c but each is also representative of the respective structural entity which is common to all of my respective compounds of formulas Ia, b, and c, whether in the form of the free bases or in the form of the acid-addition salts of the bases. I have found that by virtue of this common structural entity, the bases and their acid-addition salts have inherent pharmacodynamic activity of a type to be more fully described hereinbelow. This inherent pharmacodynamic activity can be enjoyed in useful form for pharmaceutical purposes by employing the free bases themselves or the acid-addition salts formed from pharmaceuticaly-acceptable acids, that is, acids whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the invention, I prefer of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding pharamaceutically-acceptable bases by decomposition of the salt with aqueous base as explained above, or alternatively, they can be converted to any desired pharmaceutically-acceptable acid-addition salt by double decomposition reactions involving the anion, for example, by ion-exchange procedures.

Moreover, apart from their usefulness in pharmaceutical applications, my salts are useful as characterizing or identifying derivatives of the free bases or in isolation or purification procedures. Like all of the acid-addition salts, such characterizing or purfication salt derivatives can, if desired, be used to regenerate the pharmaceutically-acceptable free bases by reaction of the salts with aqueous base, or alternatively can be converted to a pharmaceutically-acceptable acid-addition salt by, for example, ion-exchange procedures.

It will be appreciated from the foregoing that all of the acid-addition salts of my new bases are useful and valuable compounds, regardless of considerations of solubility, toxicity, physical form, and the like, and are accordingly within the purview of the instant invention.

The novel feature of the compounds of the invention, then, resides in the concept of the bases and cationic forms of the new 1-[(3-, 2-, and 1-indoyl)-lower-alkyl] piperidines and not in any particular acid moiety or acid anion associated with the salt forms of my compounds; rather, the acid moieties or anions which can be associated in the salt forms are in themselves neither novel nor critical and therefore can be any acid anion or acid-like substance capable of salt formation of bases. In fact, in aqueous solutions, the base form or water-soluble acid-addition salt form of the compounds of the invention both possess a common protonated cation or ammonium ion.

Thus the acid-addition salts discussed above and claimed herein are prepared from any organic acid, including organic acids having an inorganic group therein), or organo-metallic acid as exemplified by organic mono- and polycarboxylic acids such as found, for example, in Beilstein's Organische Chemie, 4th ed., volumes III, IV, IX, X, XIV, XVII, XIX, XXI, XXII, and XXV; organic mono- and polysulfonic and -sulfinic acids such as found, for example, in Beilstein volumes VI, XI, XVI, and XXII; organic phosphonic and phosphinic acids such as found, for example, in Beilstein volumes XI and XVI; organic acids of arsenic and antimony such as found, for example, in Beilstein volume XVI; organic heterocyclic carboxylic, sulfonic, and sulfinic acids such as found, for example, in Beilstein volumes XVIII, XXII, and XXV; acidic ion-exchange resins, for example Amberlite® XE-66 resin; and inorganic acids of any acid forming element or combination of elements such as found in Mellor, Comprehensive Treatise on Inorganic and Theoretical Chemistry, Longmans, Green and Co., New York, N.Y., volumes I–XVI. In addition, other salt-forming compounds which are acidic in their chemical properties but which are not generally considered as acids in the same sense as carboxylic or sulfonic acids are also considered to be among the numerous acids which can be used to prepare acid-addition salts of the compounds of the invention. Thus there is also comprehended acidic phenolic compounds such as found, for example, in volume VI of Beilstein; acidic compounds having "activated" or acidic hydrogen atoms, as for example, picrolonic acid, or barbituric acid derivatives having an acidic proton such as found, for example, in Cox et al., Medicinal Chemistry, vol. IV, John Wiley and Sons, Inc., New York, N.Y. (1959). Also comprehended as salt forming agents are so-called Lewis acids which lack a pair of electrons in the outer "electron shell" and react with basic compounds having an unshared pair of electrons to form salts, for example boron trifluoride.

Thus appropriate acid-addition salts are those derived from such diverse acids as formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethylphosphonic acid, p-aminophenylarsinic acid, phenylstibnic acid, phenylphosphinous acid, methylphosphinic acid, phenylphosphinic acid, Amberlite® XE-66 resin, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

The quaternary ammonium salts of the compounds of Formulas Ia, b, and c, are obtained by the addition of esters of strong acids to the free base form of the compounds, said esters having a molecular weight less than about 300. A preferred class of esters comprises alkyl, alkenyl, and monocarbocyclic aryl-lower-alkyl esters of strong inorganic acids or organic sulfonic acids, including such compounds as methyl chloride, methyl bromide, methyl iodide, ethyl bromide, propyl chloride, allyl chloride, allyl bromide, methyl sulfate, methyl benzenesulfonate, methyl p-toluenesulfonate, benzyl chloride, benzyl bromide, and substituted benzyl halides, for example p-chlorobenzyl chloride, 3,4-dichlorobenzyl chloride, 2,3,4,5,6-pentachlorobenzyl chloride, 4-nitrobenzyl chloride, 4-methoxybenzyl chloride, and the like.

The quaternary ammonium salts are prepared by mixing the free base and ester of a strong acid in an inert solvent. Heating may be used to facilitate the reaction, although salt formation usually takes place readily at room temperature. The quaternary ammonium salt separates directly or can be obtained by concentration of the solution.

As in the case of the acid-addition salts, water insolubility, high toxicity, or lack of crystalline character may make some quaternary ammonium salt species unsuitable or less desirable for use as such in a given pharmaceutical application, the water-insoluble or toxic salts can be converted to the corresponding pharmaceutically-acceptable salts by double decomposition reactions involving the anion, for example, by ion-exchange procedures. Alternatively, if the anion of the original quaternary salt forms a water-insoluble silver salt, the quaternary salt will react with silver oxide in aqueous medium to form the corresponding quaternary ammonium hydroxide, the original anion being removed as a precipitate. The quaternary ammonium hydroxide solution can then be neutralized with any desired acid, weak or strong, to produce a new quaternary ammonium salt in which the anion is different from that of the original salt. In this way quaternary ammonium salts in which the anion is derived from a weak acid are formed.

Pharmacological evaluation of the compounds of Formulas Ia, b, and c have shown that they possess pharmacodynamic and chemotherapeutic properties, in particular, hypotensive, sedative, anti-inflammatory, monoamine oxidase inhibitory, coronary dilator, adrenolytic, tranquilizing, and antibacterial activities thus indicating their usefulness as blood pressure lowering agents, sedatives, anti-inflammatory agents, psychic energizers, coronary dilators, tranquilizers, and anti-bacterial agents.

The compounds can be prepared for use by dissolving under sterile conditions a salt form of the compounds in water (or an equivalent amount of a non-toxic acid if the free base is used), or in a physiologically compatible aqueous medium such as saline, and stored in ampoules for intramuscular injection. Alternatively, they can be incorporated in unit dosage form as tablets or capsules for oral administration either alone or in combination with suitable adjuvants such as calcium carbonate, starch, lactose, talc, magnesium stearate, gum acacia, and the like. Still further the compounds can be formulated for oral administration in aqueous alcohol, glycol or oil solutions or oil-water emulsions in the same manner as conventional medicinal substances are prepared. When used as hypotensive agents, they are formulated and used in the same manner as conventional hypotensive agents, such as reserpine preparations, and indeed can be used advantageously in combination with such hypotensive agents.

The structures of the compounds of the invention are established by their mode of synthesis and corroborated by the correspondence between calculated values for the elements and values found by chemical analysis.

The following examples will further illustrate the invention without the latter being limited thereto.

EXAMPLE 1

*3 - [2-(4-carbomethoxy-1-piperidyl)ethyl]indole* [Ia: $R_1$, $R_2$, $R_3$, and $R_4$ are H; $R_5$ is 4-$COOCH_3$; Alk is $CH_2CH_2$].

A solution of 4.48 g. (0.02 mole) or 2-(3-indolyl)-ethyl bromide and 6.3 g. (0.04 mole) of 4-carbomethoxy-piperidine in 200 ml. of acetonitrile was heated under reflux for about twenty-four hours, and then taken to dryness in vacuo. The residue was taken into water, extracted with ether and the organic extracts dried and evaporated to dryness. Several recrystallizations of the residual solid from an acetonehexane mixture afforded 3.8 g. of 3-[2-(4-carbomethoxy-1-piperidyl)ethyl]indole, M.P. 110.4–111.8° C. (corr.).

3 - [2-(4-carbomethoxy-1-piperidyl)ethyl]indole reacts with formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenylphosphinous acid, methylphosphonic acid, phenylphosphinic acid, Amberlite® XE–66, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like, to give, respectively, the formate, acetate, isobutyrate, alpha-mercaptopropionate, malate (or acid malate), fumarate (or acid fumarate), succinate (or acid succinate), succinamate, tartrate (or bitartrate), citrate (or acid citrate), lactate, benzoate, 4-methoxybenzoate, phthalate (or acid phthalate), anthranilate, 1-naphthalenecarboxylate, cinnamate, cyclohexanecarboxylate, mandelate, tropate, crotonate, acetylene decarboxylate, sorbate (or acid sorbate), 2-furancarboxylate, cholate, pyrenecarboxylate, 2-pyridinecarboxylate, 3-indoleacetate, quinate, sulfamate, methanesulfonate, isethionate, benzenesulfonate, p-toluenesulfonate, benzenesulfinate, butylarsonate, diethylphosphinate, p - aminophenylarsinate, phenylstibnate, phenylphosphinite, methylphosphonate, phenylphosphinate, Amberlite® XE–66 resin salt, hydrofluoride, hydrochloride, hydrobromide, hydriodide, perchlorate, nitrate, sulfate (or bisulfate), phosphate (or acid phosphate), hydrocyanide, phosphotungstate, molybdate, phosphomolybdate, pyrophosphate, arsenate, picrate, picrolonate, barbiturate and boron trifluoride salts.

3-[2-(4-carbomethoxy-1-piperidyl)ethyl]indole can be reacted with hydriodic acid to form 3-[2-(4-carbomethoxy-1-piperidyl)ethyl]indole hydriodide, useful as a characterizing intermediate.

3-[2-(4-carbomethoxy-1-piperidyl)ethyl]indole, in the form of its hydriodide salt, can be converted to the hydrochloride salt by passing an aqueous solution of the former over an ion-exchange resin saturated with chloride ions, for example Rohm & Haas' Amberlite® IRA–400 resin.

3-[2-(4-carbomethoxy-1-piperidyl)ethyl]indole can be reacted with methyl iodide, methyl bromide, ethyl bromide, allyl bromide, benzyl chloride, 2-chlorobenzyl chloride, 2,3,4,5,6-pentachlorobenzyl chloride, or methyl p-toluenesulfonate to give the methiodide, methobromide, ethobromide, allobromide, benzochloride, 2-chlorobenzochloride, 2,3,4,5,6-pentachlorobenzochloride, or metho-p-toluenesulfonate salts, respectively.

The compounds of Formulas Ia and Ic listed in Table 1 below were prepared according to the procedure described above in Example 1 from an appropriate (3- or 1-indolyl)-lower-alkyl halide and an appropriate substituted-piperidine. All melting points are correct unless noted otherwise. The compounds of Formula Ic are indicated by an asterisk (*).

TABLE 1

| Example | $R_1/R_2$ | $R_3/R_4$ | $R_5$/Alk | Base or Salt | M.P./Cryst. from— |
|---|---|---|---|---|---|
| 2 | H/H | H/H | 3-COOCH$_3$<br>CH$_2$CH$_2$ | Base | 107.8–110.8° C.; benzene-hexane. |
| 3 | H/H | H/H | 2-COOC$_2$H$_5$<br>CH$_2$CH$_2$ | do | 125.2–126.8° C.; acetone/hexane. |
| 4* | H/— | H/H | 4-COOCH$_3$<br>(CH$_2$)$_3$ | HCl | 130.6–132.4° C.; methanol. |
| 5* | H/— | H/H | 3-COOCH$_3$<br>(CH$_2$)$_3$ | HCl | 116.2–118.0° C.; ethanol/ether. |
| 6 | H/H | H/H | 4-CONH$_2$<br>CH$_2$CH$_2$ | Base | 182.6–184.0° C.; ethyl acetate. |
| 7 | H/H | H/H | 4-NHCOCH$_3$<br>CH$_2$CH$_2$ | do | 166.8–169.2° C.; ethyl acetate. |
| 8 | H/H | H/H | 4-CONHC$_2$H$_5$<br>CH$_2$CH$_2$ | do | 166.4–168.6° C.; ethyl acetate. |
| 9 | H/H | H/H | 4-CON(C$_2$H$_5$)$_2$<br>CH$_2$CH$_2$ | do | 139.2–140.4° C.; ethyl acetate. |
| 10 | H/H | H/H | 4-CONHCH$_3$<br>(CH$_2$)$_3$ | do | 139.8–140.6° C.; ethyl acetate/hexane. |
| 11 | H/H | H/H | 4-CONHC$_2$H$_5$<br>(CH$_2$)$_3$ | do | 147.0–148.2° C.; ethyl acetate/hexane. |
| 12* | H/— | H/H | 4-CONH$_2$<br>(CH$_2$)$_3$ | do | 126.8–127.8° C.; ethyl acetate. |
| 13* | H/— | H/H | 4-CONHCH$_3$<br>(CH$_2$)$_3$ | do | 104.2–106.0° C.; isopropanol. |
| 14* | H/— | H/H | 4-CONHC$_2$H$_5$<br>(CH$_2$)$_3$ | do | 106.2–106.8° C.; hexane. |
| 15* | H/— | H/H | 2-CONHC$_2$H$_5$<br>(CH$_2$)$_3$ | do | 71.2–73.0° C.; ethyl acetate/hexane. |
| 16 | H/H | H/H | 4-CH$_2$C$_6$H$_{11}$<br>CH$_2$CH$_2$ | do | 143.0–143.8° C.; hexane. |
| 17 | H/H | H/H | 4-COOCH$_3$<br>(CH$_2$)$_3$ | do | 76.0–77.2° C.; ethyl acetate/pentane. |
| 18* | H/— | CH$_3$/H | 4-COOCH$_3$<br>(CH$_2$)$_3$ | HCl | 170.2–175.0° C.; methanol/ether. |
| 19 | H/H | H/H | 4-CH$_2$C$_6$H$_{11}$<br>(CH$_2$)$_5$ | Base | 125.6–127.2° C.; ethyl acetate. |
| 20* | H/— | CH$_3$/H | 4-CH$_2$C$_6$H$_{11}$<br>(CH$_2$)$_3$ | Maleate | 133.0–135.0° C.; isopropanol/ether. |
| 21 | H/H | H/H | 4-CH$_2$C$_6$H$_5$<br>CH$_2$CH$_2$ | Base | 94.2–95.6° C.; hexane. |

*Compound of Formula Ic.

EXAMPLE 22

3-[2-(4-aminocarbamyl-1 - piperidyl)ethyl]indole [Ia: $R_1$, $R_2$, $R_3$, and $R_4$ are H; $R_5$ is 4-CONHNH$_2$; Alk is CH$_2$CH$_2$].

A solution of 3.0 g. (0.01 mole) of 3-[2-(4-carbomethoxy-1-piperidyl)ethyl]indole, in 16 ml. of hydrazine hydrate, was heated under reflux for six hours. The reaction mixture was then evaporated to dryness in vacuo, and the gummy white crystalline residue was extracted with five 50 ml. portions of boiling chloroform. The chloroform extracts were filtered, concentrated to about 100 ml. and diluted with 400 ml. of hexane. The solid which separated was collected, washed with cold hexane and recrystallized repeatedly from a chloroform-hexane mixture giving 3.88 g. of 3-[2-(4-aminocarbamyl-1-piperidyl) ethyl]indole, M.P. 164.6–166.0° C. (corr.).

EXAMPLE 23

3-[2-(4-isopropylaminocarbamyl-1 - piperidyl)ethyl]indole [Ia: $R_1$, $R_2$, $R_3$, and $R_4$ are H; $R_5$ is

4-CONHN=C(CH$_3$)$_2$

Alk is CH$_2$CH$_2$].

A solution of 4.0 g. (0.014 mole) of 3-[2-(4-aminocarbamyl-1-piperidyl)ethyl]indole, in 60 ml. of acetone, was heated under reflux for seven hours. The solid that separated from the cooled reaction mixture was collected and recrystallized from ethyl acetate giving 3.27 g. of 3-[2-(4-isopropylidenehydrazono - 1 - piperidyl)ethyl]indole, M.P. 184.0–186.8° C. (corr.).

EXAMPLE 24

3 - [2 - (4-isopropylaminocarbamyl-1-piperidyl)ethyl] indole [Ia: $R_1$, $R_2$, $R_3$, and $R_4$ are H; $R_5$ is

4-CONHNHCH(CH$_3$)$_2$

Alk is CH$_2$CH$_2$].

About 0.02 mole of 3-[2-(4-isopropylidenehydrazono-1-piperidyl)ethyl]indole, dissolved in 200 ml. of methanol, was reduced over 0.2 g. of platinum oxide under a hydrogen pressure of about 55 pounds p.s.i. Reduction was complete in about four hours. The catalyst was removed by filtration. The filtrate was taken to dryness and the resulting solid recrystallized from a chloroform-hexane mixture giving 2.05 g. of 3-[2-(4-isopropylaminocarbamyl-1-piperidyl)ethyl]indole, M.P. 151.4–153.8° C. (corr.).

EXAMPLE 25

3-[2-(2-aminocarbamyl-1 - piperidyl)ethyl]indole [Ia: $R_1$, $R_2$, $R_3$, and $R_4$ are H; $R_5$ is 2-CONHNH$_2$; Alk is CH$_2$CH$_2$] was prepared from 2.63 g. (0.009 mole) of 3-[2-(-carbethoxy-1-piperidyl)ethyl]indole and 6 ml. of 100% hydrazine hydrate in 50 ml. of isopropyl alcohol according to the manipulative procedure described above in Example 22. The product was recrystallized from a chloroformhexane mixture giving 1.0 g. of 3-[2-(2-aminocarbamyl-1-piperidyl)ethyl]indole, M.P. 138.4–139.8° C. (corr.).

EXAMPLE 26

3-{2-[4-(N-ethylamino)-1 - piperidyl]ethyl}indole dihydrochloride [Ia: $R_1$, $R_2$, $R_3$, and $R_4$ are H; $R_5$ is 4-NHC$_2$H$_5$; Alk is CH$_2$CH$_2$].

A solution of 7.3 g. (0.03 mole) of 3-[2-(4-acetylamino-1-piperidyl)ethyl]indole, prepared above in Example 7, in 300 ml. of anhydrous tetrahydrofuran, was added dropwise with stirring to a solution of 3.89 g. (0.10 mole) of lithium aluminum hydride in 150 ml. of dry tetrahydrofuran. The mixture was then refluxed and stirred for twelve hours, cooled, and treated dropwise, while cooling and stirring, with a solution of 10 ml. of water in 25 ml. of tetrahydrofuran. Filtration of the mixture and evaporation of the filtrate to dryness gave a gray-tan solid which was dissolved in absolute ethanol and converted to the dihydrochloride salt by addition of an excess of hydrogen chloride in dry ethanol-ether. There was thus obtained 2.3 g. of 3-{2-[4-(N-ethylamino)-1-piperidyl]ethyl}indole dihydrochloride, M.P. 259.6–262° C. (corr.).

EXAMPLE 27

3-{2-[4-(N - ethylaminomethyl) - 1-piperidyl]ethyl}indole dihydrochloride [Ia: $R_1$, $R_2$, $R_3$, and $R_4$ are H; $R_5$ is 4-$CH_2NHC_2H_5$; Alk is $CH_2CH_2$] was prepared from 5.50 g. (0.02 mole) of 3-{2-[4-(N-ethylcarbamyl)-1-piperidyl]ethyl}indole, prepared above in Example 8, by reduction of the latter in 280 ml. of dry tetrahydrofuran with 1.40 g. (0.04 mole) of lithium aluminum hydride in 200 ml. of anhydrous tetrahydrofuran according to the manipulative procedure described above in Example 26. The product was isolated in the form of the free base and converted to the dihydrochloride salt. The latter was recrystallized from a methanol-ether mixture giving 3.18 g. of 3-{2-[4-(N-ethylaminomethyl)-1-piperidyl]ethyl}indole dihydrochloride. (Does not melt up to 290° C.)

EXAMPLES 28-33

By following the manipulative procedure described above in Example 1, substituting for the 4-carbomethoxypiperidine used therein a molar equivalent amount of an appropriate substituted-piperidine, there can be obtained the compounds of Formula Ia listed below in Table 2 where $R_1$, $R_2$, $R_3$, and $R_4$ in each case is hydrogen and Alk in each case is $(CH_2)_2$.

TABLE 2 (FORMULA Ia)

| Example | $R_5$ |
|---|---|
| 28 | 4-N(n-$C_4H_9$)$_2$ |
| 29 | 2-CONH$CH_2$CH=$CH_2$ |
| 30 | 4-N($CH_2$CH=$CH_2$)$_2$ |
| 31 | 4-(4-Cl$C_6H_4$$CH_2$) |
| 32 | 4-(2-$CH_3$$C_6H_4$$CH_2$) |
| 33 | 4-$C_5H_9$$CH_2$ |

EXAMPLE 34

3-{2-[2-(N-allylaminomethyl) - 1 - piperidyl]ethyl}indole [Ia: $R_1$, $R_2$, $R_3$, and $R_4$ are H; $R_5$ is

2-$CH_2NHCH_2CH$=$CH_2$

Alk is $(CH_2)_2$].

By reacting the 3-{2-[2-(N-allylcarbamyl)-1-piperidyl]ethyl}indole prepared above in Example 29 with lithium aluminum hydride in an organic solvent inert under the conditions of the reaction, for example diethyl ether or tetrahydrofuran, there can be obtained 3-{2-[2-(N-allylaminomethyl)-1-piperidyl]ethyl}indole.

EXAMPLES 35-51

By following the manipulative procedure described above in Example 1, substituting for the 2-(3-indolyl) ethyl bromide used therein, a molar equivalent amount of an appropriate 2-(3-indolyl)ethyl halide substituted in the 1- and/or 2-positions, there can be obtained the compounds of Formula Ia listed below in Table 3 where $R_1$ and $R_4$ in each case is hydrogen, $R_5$ in each case is 4-COO$CH_3$, and Alk in each case is $CH_2CH_2$.

TABLE 3 (FORMULA Ia)

| Example | $R_2$ | $R_3$ |
|---|---|---|
| 35 | $CH_3$ | $CH_3$ |
| 36 | $C_6H_5CH_2$ | $CH_3$ |
| 37 | 4-Cl-3-$CH_3C_6H_3CH_2$ | H |
| 38 | 4-HO$C_6H_4CH_2$ | H |
| 39 | 3,4-($CH_3O$)$_2C_6H_3CH_2$ | H |
| 40 | 3,4-O$CH_2$O$C_6H_3CH_2$ | $CH_3$ |
| 41 | 4-$CH_3SC_6H_4CH_2CH_2$ | H |
| 42 | 4-$CH_3SOC_6H_4CH_2CH_2$ | H |
| 43 | 4-$CH_3SO_2C_6H_4CH_2CH_2$ | H |
| 44 | $CH_3$ | $C_6H_5$ |
| 45 | H | 4-Cl-3-$CH_3C_6H_3$ |
| 46 | H | 4-HO$C_6H_4$ |
| 47 | H | 3,4-($CH_3O$)$_2C_6H_3$ |
| 48 | H | 3,4-(O$CH_2$O$C_6H_3$) |
| 49 | H | 4-$CH_3SC_6H_4$ |
| 50 | H | 4-$CH_3SOC_6H_4$ |
| 51 | H | 4-$CH_3SO_2C_6H_4$ |

EXAMPLES 52-55

By following the manipulative procedure described above in Example 1, substituting for the 2-(3-indolyl) ethyl bromide and the 4-carbomethoxypiperidine used therein, molar equivalent amounts of an appropriate 6-(2-indolyl)hexyl bromide and an appropriate substituted-piperidine, there can be obtained the compounds of Formula Ib listed below in Table 4 where $R_2$ in each case is hydrogen and Alk in each case is $(CH_2)_6$.

TABLE 4 (FORMULA Ib)

| Example | $R_1$ | $R_4$ | $R_5$ | $n$ |
|---|---|---|---|---|
| 52 | 6-HO | 2,4,6-tri-$CH_3$ | 4-COO$CH_3$ | 1 |
| 53 | 5,6-O$CH_2$O | 2,2,4,6,6-penta-$CH_3$ | 4-$C_6H_5CH_2$ | 1 |
| 54 | 6-$CH_3S$ | 5-$C_2H_5$ | 4-$C_5H_{11}$ | 1 |
| 55 | 6-$CH_3SO_2$ | 2,2-di-$CH_3$-6-($CH_3$)$_2$CH$CH_2$ | 4-CON$H_2$ | 1 |

EXAMPLE 56

2 - {2 - [2 - (N-allylaminomethyl)-1-piperidyl]ethyl} indole [Ib: $R_1$, $R_2$, and $R_4$ are H; $R_5$ is

2-$CH_2NHCH_2CH$=$CH_2$

Alk is $(CH_2)_2$].

By reacting 2-{2-[2-(N-allylcarbamyl) - 1 - piperidyl] ethyl}indole with lithium aluminum hydride in an organic solvent inert under the conditions of the reaction, for example diethyl ether or tetrahydrofuran, there can be obtained 2-{2-[2-(N-allylaminomethyl)-1-piperidyl] ethyl}indole.

EXAMPLE 57

4-carbomethoxy-1-[γ - (3 - indolyl)butyryl]piperidine [IIa: $R_1$, $R_2$, $R_3$, and $R_4$ are H; $R_5$ is 4-COO$CH_3$; Alk is $(CH_2)_3$].

A solution of 6.85 g. (0.05 mole) of isobutyl chloroformate in 125 ml. of acetone was added dropwise with stirring to a solution of 10.16 g. (0.05 mole) of γ-(3-indolyl)butyric acid and 11.0 g. (0.11 mole) of triethylamine in 400 ml. of acetone while maintaining the temperature at about −10 to −15° C. To the mixture was then added a solution of 8.9 g. (0.05 mole) of 4-carbomethoxypiperidine. The reaction mixture was stirred at room temperature for about two hours, the triethylamine hydrochloride that had separated was filtered off, and the filtrate concentrated to dryness. The residue was taken into ethyl acetate, the solution washed twice with 1 N hydrochloric acid, twice with water, twice with saturated aqueous sodium bicarbonate, twice again with water, and the organic solution taken to dryness. Recrystallization of the residue from an ethyl acetate-hexane mixture afforded 11.4 g. of 4-carbomethoxy-1-[γ-(3-indolyl)butyryl]piperidine, M.P. 91.4–92.8° C. (corr.).

EXAMPLES 58–100

The compounds of Formulas IIa and IIc listed below in Table 5 were prepared according to the procedure described above in Example 57 from an appropriate (3- or 1-indolyl)-lower-alkanoic acid mixed anhydride and an appropriate substituted-piperidine. All melting points are corrected unless noted otherwise. The compounds of Formula IIc are indicated by an asterisk (*).

| Example | $R_1/R_2$ | $R_3/R_4$ | $R_5$/Alk′ | M.P./Crystd. from— |
|---|---|---|---|---|
| 58 | H / H | H / H | 4-COOC$_2$H$_5$ / CH$_2$CH$_2$ | 123–125° C. (uncorr.); benzene/hexane. |
| 59 | H / H | H / H | 3-COOCH$_3$ / CH$_2$CH$_2$ | 107.4–108.4° C.; ethyl acetate/hexane. |
| 60 | H / H | H / H | 2-COOC$_2$H$_5$ / CH$_2$CH$_2$ | 86.8–88.4° C.; ethyl acetate/hexane. |
| 61 | H / H | H / H | 4-CONH$_2$ / CH$_3$CH$_2$ | 203.6–205.2° C.; ethyl acetate/hexane. |
| 62 | H / H | H / H | 4-CONHC$_2$H$_5$ / CH$_2$CH$_2$ | 169.5–171.0° C. (uncorr.); ethyl acetate/hexane. |
| 63 | H / H | H / H | 4-CON(C$_2$H$_5$)$_2$ / CH$_2$CH$_3$ | 133.8–135.4° C.; ethyl acetate. |
| 64 | H / H | H / H | 4-NHCOCH$_3$ / CH$_2$BH$_2$ | 188.8–190.2° C.; ethanol/hexane. |
| 65* | H / — | H / H | 4-COOCH$_3$ / CH$_2$CH$_2$ | Yellow viscous oil. |
| 66* | H / — | H / H | 4-CON(C$_2$H$_5$)$_2$ / CH$_2$CH$_2$ | Do. |
| 67* | H / — | H / H | 4-NHCOCH$_3$ / CH$_2$CH$_2$ | 127.4–128.6° C.; ethyl acetate. |
| 68 | H / H | H / H | 2-CH$_2$C$_6$H$_{11}$ / CH$_2$CH$_2$ | Brown viscous oil. |
| 69 | H / H | CH$_3$ / H | 2-CH$_2$C$_6$H$_{11}$ / CH$_2$CH$_2$ | |
| 70 | H / H | H / H | 4-CH$_2$C$_6$H$_{11}$ / CH$_2$CH$_2$ | 129.6–133.0° C.; ethyl acetate/hexane. |
| 71 | H / H | CH$_3$ / H | 4-CH$_2$C$_6$H$_{11}$ / CH$_2$CH$_2$ | Yellow viscous oil. |
| 72 | H / H | H / H | 2-CH$_2$C$_6$H$_{11}$ / (CH$_2$)$_3$ | |
| 73 | H / H | H / H | 4-CH$_2$C$_6$H$_{11}$ / (CH$_2$)$_3$ | |
| 74 | H / H | H / H | 2-CH$_2$C$_6$H$_{11}$ / (CH$_2$)$_4$ | 95.5–96.5° C.; ethyl acetate/hexane. |
| 75 | H / H | CH$_3$ / H | 4-CH$_2$C$_6$H$_{11}$ / (CH$_2$)$_2$ | Oil. |
| 76 | H / H | H / H | 4-CH$_2$C$_6$H$_{11}$ / (CH$_2$)$_5$ | 131.5–132.5° C.; ethyl acetate/hexane. |
| 77 | H / H | H / H | 4-CH$_2$C$_6$H$_5$ / CH$_2$CH$_2$ | 109.6–111.2° C.; ethyl acetate/hexane. |
| 78 | H / H | H / H | 4-CH$_2$C$_6$H$_5$ / (CH$_2$)$_3$ | Oil. |
| 79* | H / — | H / H | 2-CH$_2$C$_6$H$_{11}$ / CH$_2$CH$_2$ | Viscous oil. |
| 80* | H / — | H / H | 4-CH$_2$C$_6$H$_{11}$ / CH$_2$CH$_2$ | |
| 81* | H / — | CH$_3$ / H | 4-CH$_2$C$_6$H$_{11}$ / CH$_2$CH$_2$ | |
| 82* | H / — | H / H | 4-CH$_2$C$_6$H$_{11}$ / (CH$_2$)$_4$ | Brown viscous oil. |
| 83 | 5-CH$_3$ / H | H / H | 4-CH$_2$C$_6$H$_{11}$ / CH$_2$CH$_2$ | 143.2–144.5° C.; ethyl acetate/hexane. |
| 84 | 5-F / H | H / H | 2-CH$_2$C$_6$H$_{11}$ / CH$_2$CH$_2$ | 158.8–160.2° C.; ethyl acetate/hexane. |
| 85 | 5-F / H | H / H | 4-CH$_2$C$_6$H$_{11}$ / CH$_2$CH$_2$ | 120.4–122.2° C.; ethyl acetate/hexane. |
| 86 | 5-F / H | H / H | 4-CH$_2$C$_6$H$_{11}$ / (CH$_2$)$_3$ | 149.8–151.0° C.; ethyl acetate/hexane. |
| 87 | 5-F / H | H / H | 4-CH$_2$C$_6$H$_5$ / CH$_2$CH$_2$ | 135.0–136.4° C.; ethyl acetate/hexane. |
| 88 | 5-CH$_3$O / H | H / H | 4-CH$_2$C$_6$H$_{11}$ / CH$_2$CH$_2$ | Brown viscous oil. |
| 89 | 5,6-di-CH$_3$O / H | CH$_3$ / H | 4-CH$_2$C$_6$H$_{11}$ / CH$_2$CH$_2$ | Brown glass. |
| 90 | 5-C$_6$H$_5$CH$_2$O / H | H / H | 4-CH$_2$C$_6$H$_{11}$ / CH$_2$CH$_2$ | 148–149° C. |
| 91 | 5-C$_6$H$_5$CH$_2$O / H | H / H | 4-CH$_2$C$_6$H$_{11}$ / (CH$_2$)$_3$ | Brown viscous oil. |
| 92 | 5-CF$_3$ / H | H / H | 4-CH$_2$C$_6$H$_{11}$ / CH$_2$CH$_2$ | 160° C. |
| 93 | 5-CF$_3$ / H | H / H | 4-CH$_2$C$_6$H$_{11}$ / (CH$_2$)$_3$ | 154.5–155.3° C. |
| 94 | H / H | H / H | 4-CH$_2$C$_6$H$_{11}$ / CH=CH | |
| 95 | H / H | H / H | 4-CH$_2$C$_6$H$_5$ / CH=CH | 118–120° C.; ethyl acetate/hexane |
| 96 | H / H | H / H | 4-COOCH$_2$CH(CH$_3$)$_2$ / CH$_2$CH$_2$ | 107.8–109.2° C.; ethyl acetate/hexane. |
| 97 | H / H | H / H | 3-CONHC$_2$H$_5$ / CH$_2$CH$_2$ | 157.4–158.4° C. |
| 98* | H / — | H / H | 2-COOC$_2$H$_5$ / CH$_2$CH$_2$ | 95.2–97.2° C.; hexane. |
| 99* | H / — | H / H | 3-CONHC$_2$H$_5$ / CH$_2$CH$_2$ | 111.2–112.8° C. |
| 100 | H / H | H / H | 4-COOCH$_3$ / CH$_2$CH$_2$ | 123.2–124.2° C.; ethyl acetate/hexane. |

*Compound of Formula IIc.

EXAMPLE 101

4 - aminocarbamyl - 1-[β-(3-indolyl)propionyl]piperidine [IIa: $R_1$, $R_2$, $R_3$, and $R_4$ are H; $R_5$ is 4-CONHNH$_2$; Alk' is CH$_2$CH$_2$].

A solution of 4.1 g. (0.13 mole) of the 4-carbomethoxy-1-[β-(3-indolyl)propionyl]piperidine, prepared above in Example 100, in 12 ml. of 100% hydrazine hydrate and 60 ml. of isopropyl alcohol, was heated under reflux for about seven hours. The mixture was taken to dryness in vacuo, and the resulting solid was slurried with 25 ml. of saturated aqueous sodium bicarbonate solution and then filtered. The insoluble material was recrystallized from a chloroform-hexane mixture giving 2.53 g. of 4-aminocarbamyl-1-[β-(3-indolyl)propionyl]piperidine, M.P. 126.9–130° C. (corr.).

EXAMPLES 102–140

The compounds of Formulas Ia and Ic listed below in Table 6 were prepared by reducing the respective compounds of Examples 57–95 with lithium aluminum hydried in tetrahydrofuran according to the manipulative procedure described above in Example 26. All melting points are corrected unless noted otherwise. The compounds of Formula Ic are indicated by an asterisk (*).

TABLE 6

| Example | $R_1/R_2$ | $R_3/R_4$ | $R_5$/Alk | Base or Salt | M.P./Cryst. from— |
|---|---|---|---|---|---|
| 102 | H / H | H / H | 4-CH$_2$OH / (CH$_2$)$_4$ | Base | 164.2–165.0° C.; ethyl acetate. |
| 103 | H / H | H / H | 4-CH$_2$OH / (CH$_2$)$_3$ | do | 151.8–153.2° C.; ethyl acetate. |
| 104 | H / H | H / H | 3-CH$_2$OH / (CH$_2$)$_3$ | do | 160.8–163.8° C.; ethyl acetate. |
| 105 | H / H | H / H | 2-CH$_2$OH / (CH$_2$)$_3$ | do | 151.4–154.6° C.; ethyl acetate. |
| 106 | H / H | H / H | 4-CH$_2$NH$_2$ / (CH$_2$)$_3$ | do | 115.6–116.0° C.; ethyl acetate/hexane. |
| 107 | H / H | H / H | 4-CH$_2$NHC$_2$H$_5$ / (CH$_2$)$_3$ | 2HCl | 245.4–247.2° C.; ethanol. |
| 108 | H / H | H / H | 4-CH$_2$N(C$_2$H$_5$)$_2$ / (CH$_2$)$_3$ | 2HCl | 202.4–208° C.; ethanol. |
| 109 | H / H | H / H | 4-NHC$_2$H$_5$ / (CH$_2$)$_3$ | 2HCl | 277.2–279.2° C.; methanol/ethanol. |
| 110* | H / — | H / H | 4-CH$_2$OH / (CH$_2$)$_3$ | Base | 85.8–87.0° C.; ethyl acetate/hexane. |
| 111* | H / — | H / H | 4-CH$_2$N(C$_2$H$_5$)$_2$ / (CH$_2$)$_3$ | 2HCl | 219.4–220.6° C.; isopropanol/ether. |
| 112* | H / — | H / H | 4-NHC$_2$H$_5$ / (CH$_2$)$_3$ | 2HCl | 264.6–266.2° C.; isopropanol/ether. |
| 113 | H / H | H / H | 2-CH$_2$C$_6$H$_{11}$ / (CH$_2$)$_3$ | Base | 113.6–115.4° C.; hexane. |
| 114 | H / H | CH$_3$ / H | 2-CH$_2$C$_6$H$_{11}$ / (CH$_2$)$_3$ | do | 124.0–126.8° C.; ethyl acetate/hexane. |
| 115 | H / H | H / H | 4-CH$_2$C$_6$H$_{11}$ / (CH$_2$)$_3$ | do | 109.6–111.8° C.; hexane. |
| 116 | H / H | CH$_3$ / H | 4-CH$_2$C$_6$H$_{11}$ / (CH$_2$)$_3$ | do | 114.8–116.6° C.; hexane. |
| 117 | H / H | H / H | 2-CH$_2$C$_6$H$_{11}$ / (CH$_2$)$_4$ | C$_2$H$_5$SO$_3$H | 137.6–138.6° C.; acetone. |
| 118 | H / H | H / H | 4-CH$_2$C$_6$H$_{11}$ / (CH$_2$)$_4$ | Base | 96.6–98.0° C.; hexane. |
| 119 | H / H | H / H | 2-CH$_2$C$_6$H$_{11}$ / (CH$_2$)$_5$ | C$_2$H$_5$SO$_3$H | 124.2–126.0° C.; isopropanol/ether. |
| 120 | H / H | CH$_3$ / H | 4-CH$_2$C$_6$H$_{11}$ / (CH$_2$)$_5$ | p-Tosylate | 177.6–180° C.; isopropanol. |
| 121 | H / H | H / H | 4-CH$_2$C$_6$H$_{11}$ / (CH$_2$)$_6$ | Base | 82.0–83.8° C.; hexane. |
| 122 | H / H | H / H | 4-CH$_2$C$_6$H$_5$ / (CH$_2$)$_3$ | do | 122.0–124.0° C.; ethyl acetate/hexane. |
| 123 | H / H | H / H | 4-CH$_2$C$_6$H$_5$ / (CH$_2$)$_4$ | HCl | 192.8–195.2° C.; ethanol/ether. |
| 124* | H / — | H / H | 2-CH$_2$C$_6$H$_{11}$ / (CH$_2$)$_3$ | HCl | 151.6–154.2° C.; isopropanol. |
| 125* | H / — | H / H | 4-CH$_2$C$_6$H$_{11}$ / (CH$_2$)$_3$ | HCl | 208.4–210.0° C.; isopropanol/ether. |
| 126* | H / — | CH$_3$ / H | 4-CH$_2$C$_6$H$_{11}$ / (CH$_2$)$_3$ | Base | B.P. 180.5–184.0° C./0.00075 mm. |
| 127* | H / — | H / H | 4-CH$_2$C$_6$H$_{11}$ / (CH$_2$)$_5$ | HCl | 168.8–172.2° C.; ethanol/ether. |
| 128 | 5-CH$_3$ / H | H / H | 4-CH$_2$C$_6$H$_{11}$ / (CH$_2$)$_3$ | Base | 86.8–104.5° C.; hexane. |
| 129 | 5-F / H | H / H | 2-CH$_2$C$_6$H$_{11}$ / (CH$_2$)$_3$ | do | 120.2–122.2° C.; hexane. |
| 130 | 5-F / H | H / H | 4-CH$_2$C$_6$H$_{11}$ / (CH$_2$)$_3$ | do | 104.4–106.6° C.; hexane. |
| 131 | 5-F / H | H / H | 4-CH$_2$C$_6$H$_{11}$ / (CH$_2$)$_4$ | do | 119.2–120.0° C.; hexane. |
| 132 | 5-F / H | H / H | 4-CH$_2$C$_6$H$_5$ / (CH$_2$)$_3$ | do | 116.8–117.8° C.; ethyl acetate/hexane. |
| 133 | 5-CH$_3$O / H | H / H | 4-CH$_2$C$_6$H$_{11}$ / (CH$_2$)$_3$ | do | 118.0–119.8° C.; ethyl acetate/hexane. |
| 134 | 5,6-di-CH$_3$O / H | CH$_3$ / H | 4-CH$_2$C$_6$H$_{11}$ / (CH$_2$)$_3$ | do | 105.2–106.4° C.; hexane. |
| 135 | 5-C$_6$H$_5$CH$_2$O / H | H / H | 4-CH$_2$C$_6$H$_{11}$ / (CH$_2$)$_3$ | do | 95.0–96.0° C.; ethyl acetate/hexane. |
| 136 | 5-C$_6$H$_5$CH$_2$O / H | H / H | 4-CH$_2$C$_6$H$_{11}$ / (CH$_2$)$_4$ | HCl | 208.6–210.8° C.; acetone. |
| 137 | 5-CF$_3$ / H | H / H | 4-CH$_2$C$_6$H$_{11}$ / (CH$_2$)$_3$ | Base | 118.6–120.4° C.; hexane. |
| 138 | 5-CF$_3$ / H | H / H | 4-CH$_2$C$_6$H$_{11}$ / (CH$_2$)$_4$ | do | 143.2–145.8° C.; ethyl acetate/hexane. |
| 139 | H / H | H / H | 4-CH$_2$C$_6$H$_{11}$ / CH=CHCH$_2$ | do | 149.0–152.6° C.; ethyl acetate/hexane. |
| 140 | H / H | H / H | 4-CH$_2$C$_6$H$_5$ / CH=CHCH$_2$ | do | 131.8–134.4° C.; ethyl acetate/hexane. |

*Compound of Formula Ic.

EXAMPLES 141–145

By following the manipulative procedure described above in Example 57 substituting for the 4-carbomethoxypiperidine used therein a molar equivalent amount of an appropriately substituted piperidine, there can be obtained the compounds of Formula IIa listed below in Table 7 where $R_1$, $R_2$, $R_3$, and $R_4$ in each case are hydrogen and Alk' in each case is (CH$_2$)$_2$.

TABLE 7

| Example | $R_5$ |
|---|---|
| 141 | 4-N(n-$C_4H_9$)$_2$ |
| 142 | 2-CONHCH$_2$CH=CH$_2$ |
| 143 | 4-N(CH$_2$CH=CH$_2$)$_2$ |
| 144 | 4-C$_6$H$_{11}$CH$_2$ |
| 145 | 4-C$_5$H$_9$CH$_2$ |

EXAMPLES 146–162

By following the manipulative procedure described above in Example 57, substituting for the α-(3 indolyl)butyric acid used therein a molar equivalent amount of an appropriate β-(3-indolyl)propionic acid substituted in the 1- and/or 2-positions, there can be obtained the compounds of Formula IIa listed below in Table 8 where $R_1$ and $R_4$ in each case is hydrogen, $R_5$ in each case is 4-COOCH$_3$, and Alk in each case is CH$_2$CH$_2$.

TABLE 8 (FORMULA IIa)

| Example | $R_2$ | $R_3$ |
|---|---|---|
| 146 | CH$_3$ | CH$_3$ |
| 147 | C$_6$H$_5$CH$_2$ | CH$_3$ |
| 148 | 4-Cl-3-CH$_3$C$_6$H$_3$CH$_2$ | H |
| 149 | 4-HOC$_6$H$_4$CH$_2$ | H |
| 150 | 3,4-(CH$_3$O)$_2$C$_6$H$_3$CH$_2$ | H |
| 151 | 3,4-(OCH$_2$OC$_6$H$_3$CH$_2$) | CH$_3$ |
| 152 | 4-CH$_3$SC$_6$H$_4$CH$_2$ | H |
| 153 | 4-CH$_3$SOC$_6$H$_4$CH$_2$ | H |
| 154 | 4-CH$_3$SO$_2$C$_6$H$_4$CH$_2$ | H |
| 155 | CH$_3$ | C$_6$H$_5$ |
| 156 | H | 4-Cl-3-CH$_3$C$_6$H$_3$ |
| 157 | H | 4-HOC$_6$H$_4$ |
| 158 | H | 3,4-(CH$_3$O)$_2$C$_6$H$_3$ |
| 159 | H | 3,4-(OCH$_2$OC$_6$H$_3$) |
| 160 | H | 4-CH$_3$SC$_6$H$_4$ |
| 161 | H | 4-CH$_3$SOC$_6$H$_4$ |
| 162 | H | 4-CH$_3$SO$_2$C$_6$H$_4$ |

EXAMPLE 163

*4 - carbomethoxy - 1 - (3 - indolylglyoxalyl)piperidine* [IIIa: $R_1$, $R_2$, $R_3$, and $R_4$ are H; $R_5$ is 4-COOCH$_3$].

To a stirred solution of 9.3 g. (0.04 mole) of 4-carbomethoxypiperidine in 200 ml. of tetrahydrofuran was added dropwise over a period of about forty-five minutes a solution of 14.3 g. (0.1 mole) of 3-indolylglyoxalyl chloride while maintaining the temperature at −10 to −20° C. When all the solution had been added, the mixture was allowed to stand at about 4° C. for twelve hours. The mixture was filtered and the filtrate evaporated to dryness in vacuo leaving a reddish oil. The latter was taken into chloroform, washed twice with dilute hydrochloric acid, three times with water, twice with saturated sodium bicarbonate, and three times again with water. The chloroform solution was then dried, taken to dryness in vacuo and the residual red viscous oil was crystallized from an ethyl acetate-hexane mixture giving 10.0 g. of 4-carbomethoxy-1-(3-indolylglyoxalyl)piperidine, M.P. 135.4–136.0° C. (corr.).

EXAMPLES 164–172

The compounds of Formula IIIa listed below in Table 9 were prepared according to the procedure described above in Example 163 from an appropriate 3-indolylglyoxalyl chloride and an appropriate substituted-piperidine. The melting points are uncorrected unless noted otherwise.

TABLE 9

| Example | $R_1/R_3$ | $R_4/R_5$ | M.P./Crystd. from— |
|---|---|---|---|
| 164 | H / H | H / 2-CH$_2$C$_6$H$_{11}$ | Brown viscous oil. |
| 165 | H / CH$_3$ | H / 4-CH$_2$C$_6$H$_{11}$ | 197.5–200° C.; acetone. |
| 166 | 5-CH$_3$O / H | H / 2-CH$_2$C$_6$H$_{11}$ | 134–136° C.; ethyl acetate/hexane. |
| 167 | 5-CH$_3$O / H | H / 4-CH$_2$C$_6$H$_{11}$ | 164.5–166.0° C.; ethyl acetate/hexane. |
| 168 | 5,6-di-CH$_3$O / H | H / 4-CH$_2$C$_6$H$_{11}$ | 216–218° C.; acetone. |
| 169 | 5-F / H | H / 4-CH$_2$C$_6$H$_{11}$ | 169.2–171.8° C. (corr.); ethyl acetate/hexane. |
| 170 | 5-CH$_3$S / H | H / 4-CH$_2$C$_6$H$_{11}$ | 156–158° C.; ethyl acetate/hexane. |
| 171 | 5-C$_6$H$_5$CH$_2$O / H | H / 2-CH$_2$C$_6$H$_{11}$ | 174–176° C.; ethyl acetate/hexane. |
| 172 | 5-C$_6$H$_5$CH$_2$O / H | H / 4-CH$_2$C$_6$H$_{11}$ | 168–169° C.; ethyl acetate/hexane. |

EXAMPLE 173

*3 - [2 - (2 - cyclohexylmethyl - 1 - piperidyl)ethyl]-indole* [Ia: $R_1$, $R_2$, $R_3$, and $R_4$ are H; $R_5$ is 2-CH$_2$C$_6$H$_{11}$; Alk is CH$_2$CH$_2$].

A stirred slurry of 15.24 g. (0.40 mole) of lithium aluminum hydride in 300 ml. of dry tetrahydrofuran was added dropwise over a period of one hour to a solution of about 35 g. (0.10 mole) of 2-cyclohexylmethyl - 1 - (3 - indolylglyoxalyl)piperidine in 450 ml. of tetrahydrofuran. When addition was complete, the mixture was heated under reflux for four hours, allowed to cool, and then treated dropwise with stirring with 32 ml. of water. The mixture was filtered, the filter cake washed with tetrahydrofuran and the combined filtrates taken to dryness. Recrystallization of the residual solid several times from an ethyl acetate-hexane mixture gave 16.7 g. of 3-[2-(2-cyclohexylmethyl-1-piperidyl)ethyl]-indole, M.P. 151.6–152.8° C. (corr.).

EXAMPLES 174–181

The compounds of Formula Ia listed below in Table 10 were prepared by reducing the respective compounds of Examples 165–172 with lithium aluminum hydride in tetrahydrofuran according to the procedure described above in Example 173. All melting points are corrected unless noted otherwise, and in each case the melting point and crystallization solvent is given for the free base form of the compounds. The group Alk in each of the compounds is CH$_2$CH$_2$.

TABLE 10

| Example | $R_1/R_3$ | $R_4/R_5$ | M.P./Crystd. from— |
|---|---|---|---|
| 174 | H / CH$_3$ | H / 4-CH$_2$C$_6$H$_{11}$ | 142.4–144.2° C.; ethyl acetate. |
| 175 | 5-CH$_3$O / H | H / 2-CH$_2$C$_6$H$_{11}$ | 140.8–143.4° C.; ethyl acetate/hexane. |
| 176 | 5-CH$_3$O / H | H / 4-CH$_2$C$_6$H$_{11}$ | 98.4–99.8° C.; hexane. |
| 177 | 5,6-di-CH$_3$O / H | H / 4-CH$_2$C$_6$H$_{11}$ | 131.0–132.0° C.; ethyl acetate. |
| 178 | 5-F / H | H / 4-CH$_2$C$_6$H$_{11}$ | 140.6–141.8° C.; ethyl acetate/hexane. |
| 179 | 5-CH$_3$S / H | H / 4-CH$_2$C$_6$H$_{11}$ | 134.6–135.8° C.; ethyl acetate/hexane. |
| 180 | 5-C$_6$H$_5$CH$_2$O / H | H / 2-CH$_2$C$_6$H$_{11}$ | 81.0–85.2° C.; hexane. |
| 181 | 5-C$_6$H$_5$CH$_2$O / H | H / 4-CH$_2$C$_6$H$_{11}$ | 115.0–116.2° C.; ethyl acetate/hexane. |

EXAMPLE 182

*2-methyl-3-[2-(2-cyclohexylmethyl - 1-piperidyl)ethyl] indole* [Ia: $R_1$, $R_2$, and $R_4$ are H; $R_3$ is CH$_3$; $R_5$ is 2-C$_6$H$_{11}$CH$_2$; Alk is CH$_2$CH$_2$].

A mixture of 36.3 g. (0.02 mole) of 2-cyclohexylmethylpiperidine, 48.2 g. (0.40 mole) of 1-chloro-4-pentanone and 83.5 g. (0.6 mole) of potassium carbonate in 100 ml. of toluene was heated with stirring for six hours. The mixture was diluted with 1.5 liters of ether, filtered and the filtrate taken to dryness. Distillation of the residual oil in vacuo gave 25.2 g. of 1-(3-acetylpropyl)-2-cyclohexylmethylpiperidine, B.P. 117.0–124.0° C./0.17 mm.; $n_D^{25}$=1.4864.

A mixture of 10.6 g. (0.04 mole) of 1-(3-acetylpropyl)-2-cyclohexylmethylpiperidine, 4.35 g. (0.04 mole) of phenylhydrazine, and 15.9 ml. of 7.6 N ethanolic hydrogen chloride in 150 ml. of ethanol was heated under reflux for twenty hours and then allowed to cool. The solid which separated was collected, suspended in methylene dichloride and extracted with dilute ammonium hydroxide. The organic layer was taken to dryness and the residue recrystallized from an ethyl acetate-hexane mixture to give 5.9 g. of 2-methyl-3-[2-(2-cyclohexylmethyl-1-piperidyl)ethyl]indole, M.P. 125.4–126.6° C. (corr.).

EXAMPLES 183–186

The compounds of Formula I*a* listed below in Table 11 were prepared according to the procedure described above in Example 182 from phenylhydrazine, or an appropriate substituted-phenylhydrazine, and an appropriate 1-(ω-formyl-lower-alkyl)-substituted-piperidine or 1-(ω-lower-alkanoyl-lower-alkyl)-substituted-piperidine. The melting points are corrected unless noted otherwise, and in each case the groups $R_2$ and $R_4$ are hydrogen atoms.

solvent was evaporated, the residual oil was boiled with 450 ml. of acetone and the solid which separated was collected, dried, and recrystallized from isopropanol to give 4.1 g. of 3-[3-(4-cyclohexylmethyl-1-piperidyl)propyl]-2-methylindole 2,3,4,5,6 - pentachlorobenzochloride, M.P. 129.2–147.2° C. (corr.).

EXAMPLE 189

*3 - [3 - (4 - cyclohexylmethyl-1-piperidyl)propyl]-5-hydroxyindole* [I*a*: $R_1$ is 5-HO; $R_2$, $R_3$, and $R_4$ are H; $R_5$ is 4-$CH_2C_6H_{11}$. Alk is $(CH_2)_3$].

3-[3-(4-cyclohexylmethyl-1-piperidyl)propyl]-5-benzyloxyindole (5.5 g., 0.01 mole), prepared above in Example 135, was dissolved in 200 ml. of absolute ethanol and reduced over 1.0 g. of palladium-on-charcoal catalyst under 60 pounds p.s.i. of hydrogen at room temperature. When reduction was complete, the catalyst was removed by filtration, the filtrate taken to dryness in vacuo and the residue recrystallized from an ethyl acetate-hexane mixture giving 3.4 g. of 3-[3-(4-cyclohexylmethyl-1-piperidyl)propyl]-5-hydroxyindole, M.P. 169.4–170.4° C. (corr.).

EXAMPLE 190

*3-[2-(4-cyclohexylmethyl-1-piperidyl)ethyl]-5-hydroxy-*

| Example | $R_1/R_3$ | $R_5$/Alk | Base or Salt | M.P./Crystd. from— |
|---|---|---|---|---|
| 183 | 5,6-di-$CH_3O$ H | 2-$CH_2C_6H_{11}$ $CH_2CH_2$ | Base | 109.8–114.2° C.; ethyl acetate/hexane. |
| 184 | 5,6-di-$CH_3O$ $CH_3$ | 2-$CH_2C_6H_{11}$ $CH_2CH_2$ | do | 100.6–106.2° C.; hexane. |
| 185 | 5,6-di-$CH_3O$ $CH_3$ | 4-$CH_2C_6H_{11}$ $CH_2CH_2$ | do | 123.8–125.2° C.; ethyl acetate/hexane. |
| 186 | 5,6-$OCH_2O$ $CH_3$ | 4-$CH_2C_6H_{11}$ $CH_2CH_2$ | HCl | 262.0–264.0° C.; ethanol/ether. |

EXAMPLE 187

*3-[4-(4-cyclohexylmethyl - 1 - piperidyl) - 2 - butynyl]indole* [I*a*: $R_1$, $R_2$, $R_3$, and $R_4$ are H; $R_5$ is 4-$CH_2C_6H_{11}$; Alk is $CH_2$=$CCH_2$].

To a mixture of 9.6 g. (0.4 mole) of magnesium turnings in 40 ml. of anisole was added 64 g. (0.4 mole) of ethyl iodide. When the reaction had subsided, a solution of 31.2 g. (0.27 mole) of indole in 40 ml. of anisole was added dropwise with stirring and cooling over a period of fifteen minutes. The mixture was stirred for a half hour at room temperature, then chilled to 0–5° C. and treated dropwise over a period of a half hour with a solution of 40 ml. (61 g., 0.5 mole) of propargyl bromide in 40 ml. of anisole. Decomposition of the mixture with 24 ml. of acetic acid in 200 ml. of ice water, extraction with several portions of ether and removal of the solvent from the combined organic extracts afforded a red viscous oil which was distilled in vacuo to give 11.7 g. of 3-(2-propynyl)indole, B.P. 125.5–120.0/1.4 mm.; $n_D^{25}$=1.6110.

A mixture of 4.6 g. (0.03 mole) of 3-(2-propynyl)indole, 6.0 g. (0.03 mole) of 4-cyclohexylmethylpiperidine, and 1.0 g. (0.03 mole) of paraformaldehyde in 20 ml. of dioxane was heated on a steam bath for eleven hours. The solvent was then removed in vacuo and the residue recrystallized several times from hexane to give 2.6 g. of 3-[4-(4-cyclohexylmethyl-1-piperidyl)-2-butynyl]indole, M.P. 65.8–68.2° C.

EXAMPLE 188

*3 - [3 - (4 - cyclohexylmethyl - 1 - piperidyl)propyl]-2-methylindole 2,3,4,5,6-pentachlorobenzochloride* [I*a*: $R_1$, $R_2$, and $R_4$ are H; $R_3$ is $CH_3$; $R_5$ is 4-$CH_2C_6H_{11}$; Alk is $(CH_2)_3$].

A solution of 7.05 g. (0.02 mole) of the 3-[3-(4-cyclohexylmethyl - 1 - piperidyl)propyl]-2-methylindole, prepared above in Example 116, and 7.45 g. (0.02 mole) of 2,3,4,5,6-pentachlorobenzyl chloride in 250 ml. of acetonitrile was heated under reflux for fourteen hours. The

*indole* [I*a*: $R_1$ is 5-HO; $R_2$, $R_3$, and $R_4$ are H; $R_5$ is 4-$CH_2C_6H_{11}$; Alk is $CH_2CH_2$] was prepared from 7.7 g. (0.018 mole) of the 3-[2-(4-cyclohexylmethyl-1-piperidyl)ethyl]-5-benzyloxyindole prepared above in Example 181 using the manipulative procedure described above in Example 189. The crude product was recrystallized from an ethyl acetate-hexane mixture to give 3.9 g. of 3-[2-(4-cyclohexylmethyl-1 - piperidyl)ethyl] - 5 - hydroxyindole, M.P. 171.2–172.4° C. (corr.).

EXAMPLE 191

*1-{3-[4-(N - acetylamino) - 1 - piperidyl]propyl}indole* [I*c*: $R_1$, $R_3$, and $R_4$ are H; $R_5$ is 4-$NHCOCH_3$; Alk is $(CH_2)_3$] was prepared by reacting 6.28 g. (0.04 mole) of 4-(N-acetylamino)piperidine with 3.88 g. (0.02 mole) of 3-(2-indolyl)propyl chloride in 200 ml. of acetonitrile according to the manipulative procedure described above in Example 1. The crude product was recrystallized from an ethyl acetate-hexane mixture to give 1.43 g. of 1-{3-[4-(N-acetylamino)-1-piperidyl]propyl}indole, M.P. 117.6–120.4° C. (corr.).

EXAMPLE 192

*3-[3-(4-cyclohexylmethyl-1-piperidyl)propyl]-5-methylmercaptoindole* [I*a*: $R_1$ is 5-$CH_3S$; $R_2$, $R_3$, and $R_4$ are H; $R_5$ is 4-$CH_2C_6H_{11}$; Alk is $(CH_2)_3$] was prepared by reacting the mixed anhydride resulting from the reaction of 4.10 g. (0.019 mole) of β-(5-methylmercapto-3-indolyl)propionic acid with 2.62 g. (0.019 mole) of isobutyl chloroformate in the presence of 2.14 g. (0.02 mole) of triethylamine with 3.48 g. (0.019 mole) of 4-cyclohexylmethylpiperidine, all according to the manipulative procedure described above in Example 57, and reducing the resulting 4 - cyclohexylmethyl-1-[β-(5-methylmercapto-3-indolyl)-propionyl]-piperidine with 1.5 g. of (0.04 mole) of lithium aluminum hydride in 300 ml. of dry tetrahydrofuran according to the manipulative procedure described above in Example 26. The product was isolated as the free base and recrystallized from an ethyl acetate-hexane mixture to give 5.48 g. of 3-[3-(4-cyclohexylmethyl-1-piperidyl)-propyl]-5-methylmercaptoindole, M.P. 130.8–132.6° C. (corr.).

EXAMPLE 193

3 - [2-(4-cyclohexylmethyl-1-piperidyl)ethyl]-5-benzylthioindole [Ia: $R_1$ is 5-$C_6H_5CH_2S$; $R_2$, $R_3$, and $R_4$ are H; $R_5$ is 4-$CH_2C_6H_{11}$; Alk is $CH_2CH_2$] was prepared by reacting 6 g. (0.03 mole) of 4-cyclohexylmethylpiperidine with an equimolar amount of 5-benzylthio-3-indolylglyoxalyl chloride [prepared from 7.2 g. (0.03 mole) of 5-benzylthioindole and 4.3 g. (0.03 mole) of glyoxalyl chloride] in acetone in the presence of 3.3 g. (0.03 mole) of triethylamine, all according to the manipulative procedure described above in Example 163, and reducing the resulting 4-cyclohexylmethyl-1-(5-benzylthio-3-indolylglyoxalyl)piperidine (4.3 g., 0.01 mole) with 1.9 g. (0.05 mole) of lithium aluminum hydride according to the manipulative procedure described above in Example 173. The product was isolated as the free base and recrystallized from methanol to give 1.8 g. of 3-[2-(4-cyclohexylmethyl-1-piperidyl)-ethyl]-5-benzylthioindole, M.P. 121.4–123.4° C. (corr.).

EXAMPLES 194–210

The 3-indolyl-lower-alkanoic acids of Formula IX used as intermediates in the preparation of the compounds of Formula IIa, for example in Examples 58–100, were prepared according to the procedures which follow.

EXAMPLE 194

$\gamma$-(2-carboxy-5-fluoro-3-indolyl)butyric acid [IX: $R_1$ is 5-F; $R_2$ is H; $R_3$ is COOH; $n$ is 1; Alk' is $(CH_2)_3$]

4-fluoroaniline (33.3 g., 0.30 mole), dissolved in 58 ml. of concentrated hydrochloric acid and a handful of ice, was diazotized by dropwise addition of a solution of 21.0 g. (0.30 mole) of sodium nitrite in water. To the solution was then added 60 g. (0.44 mole) of sodium acetate trihydrate and 51.1 g. (0.30 mole) of ethyl cyclohexanone-2-carboxylate.

The reaction mixture deposited crude 2-carbethoxy-2-(4-fluorobenzeneazo)cyclohexanone which was heated with 300 ml. of a 7% aqueous solution of sodium carbonate. The resulting red solution was charcoaled, carefully acidified with excess concentrated hydrochloric acid, and the solid which separated was collected and dried to give the crude 4-fluorophenylhydrazone of ethyl α-ketopimelic acid half ester, which was recrystallized from ethyl acetate/hexane to give 52 g. of material of M.P. 143–145° C. (uncorr.).

The latter was dissolved in a solution containing 30 ml. of concentrated sulfuric acid in 300 ml. of absolute ethanol and refluxed for about six hours. The cooled solution was taken to dryness, dissolved in ether and extracted with water. Evaporation of the solvent and recrysallization of the residue from ethyl acetate/hexane gave 48 g. of ethyl $\gamma$(2-carbethoxy-5-fluoro-3-indolyl)butyrate.

The latter (40.5 g., 0.13 mole) was heated for two hours in 400 ml. of 10% aqueous potassium hydroxide, and the solution was filtered and the filtrate acidified. Collection of the precipitated solid gave 30.2 g. of $\gamma$-(2-carboxy-5-fluoro-3-indolyl)butyric acid, M.P. 230.2–231.2° C.

EXAMPLES 195–200

The following compounds of Formula IX listed below in Table 12 were prepared from an appropriate substituted aniline and an appropriate lower-alkyl cycloalkanone-2-carboxylate using the procedure described above in Example 194. In each case, $R_2$ is a hydrogen atom and $R_2$ is COOH. All melting points are corrected unless noted otherwise.

TABLE 12

| Example | $R_1$ | Alk' | M.P./Crystd. from— |
| --- | --- | --- | --- |
| 195 | 5-$CF_3$ | $CH_2CH_2$ | 229.6–229.8° C.; methanol/water. |
| 196 | 5-$C_6H_5CH_2S$ | $CH_2CH_2$ | 185–187.0° C.; ethyl acetate/hexane. |
| 197 | 5-$CF_3$ | $(CH_2)_3$ | 227.5–228.0° C. |
| 198 | 5-F | $CH_2CH_2$ | 236.2–237.4° C.; ethyl acetate. |
| 199 | 5-$CH_3$ | $CH_2CH_2$ | 219.7–219.8° C.; ethyl acetate/ethanol. |
| 200 | 5-$C_6H_5CH_2O$ | $(CH_2)_3$ | 199.0–201.2° C.; ethyl acetate/hexane. |

EXAMPLE 201

$\gamma$-(5-Fluoro-3-indolyl)butyric acid [IX: $R_1$ is 5-F; $R_2$ and $R_3$ are H; $n$ is 1; Alk' is $(CH_2)_3$].

A mixture of 10 g. (0.21 mole) of $\gamma$-(2-carboxy-5-fluoro-3-indoyl)butyric acid, 0.5 g. of copper-bronze powder and 50 ml. of quinoline in a flask equipped with a magnetic stirrer, an internal thermometer and a gas inlet tube was heated under nitrogen for two hours at 220–235° C. The cooled mixture was then poured into ether, filtered and the filtrate extracted with 10% aqueous sodium carbonate. Acidification of the combined extracts gave 6.6 g. of crude $\gamma$-(5-fluoro-3-indolyl)butyric acid, which on recrystallizing from hot water gave 1.95 g. of material having M.P. 126.4–127.2° C. (corr.).

EXAMPLES 202–207

The following compounds of Formula IX listed below in Table 13 were prepared from the corresponding (2-carboxy-3-indolyl)-lower-alkanoic acid using the procedure described above in Example 201. In each case $R_2$ and $R_3$ are hydrogen atoms, and all melting points are corrected unless noted otherwise.

TABLE 13

| Example | $R_1$ | Alk' | M.P./Crystd. from— |
| --- | --- | --- | --- |
| 202 | 5-$CF_3$ | $CH_2CH_2$ | 84.0–90.0° C.; ethyl acetate/hexane. |
| 203 | 5-$C_6H_5CH_2S$ | $CH_2CH_2$ | 86.0–95.0° C.; ethyl acetate/hexane. |
| 204 | 5-$CF_3$ | $(CH_2)_3$ | 158.6–159.6° C.; ethyl acetate/hexane. |
| 205 | 5-F | $CH_2CH_2$ | 121.2–123.0° C.; water. |
| 206 | 5-$CH_3$ | $CH_2CH_2$ | 137–139° C. (uncorr.); water. |
| 207 | 5-$C_6H_5CH_2O$ | $(CH_2)_3$ | 159–161° C. (uncorr.); ethyl acetate/hexane. |

EXAMPLE 208

$\gamma$-(2-Methyl-3indolyl)butyric acid [I: $R_1$ and $R_2$ are H; $R_3$ is $CH_3$; Alk' is $(CH_2)_3$].

A solution of methyl magnesium iodide in ether was prepared by reacting 46.8 g. (0.33 mole) of methyl iodide in 50 ml. of ether with 8.7 g. (0.36 mole) of magnesium turnings in 200 ml. of ether. To the solution was added, over a period of fifteen minutes, a solution of 39.4 g. (0.3 mole) of 2-methylindole in 100 ml. of ether. The mixture was refluxed for one hour, cooled, treated with a solution of 44.4 g. (0.3 mole) of $\gamma$-bromobutyronitrile, then stirred for three hours in an ice-bath and at room temperature for an additional three and an half hours. Decomposition of the mixture with aqueous ammonium chloride, separation of the layers and removal of the ether from the organic layer afforded an oil which was distilled in vacuo to give 16.5 g. of $\gamma$-(2-methyl-3-indolyl)butyronitrile as a viscous yellow oil, B.P. 159–160°/0.0002 mm.; $n_D^{25}$=1.5857.

The latter (19.0 g., 0.096 mole) was refluxed for twenty-four hours with a solution of 150 ml. of 20% potassium hydroxide and 100 ml. of ethanol. The ethanol was then removed by distillation, the filtrate acidified with acetic acid, and the material which separated was collected. The latter, on addition of acetic acid and recrystallization from methanol/water, gave 9.2 g. of γ-(2-methyl-3-indolyl)butyric acid, M.P. 91.2–93.0° C. (corr.)

EXAMPLE 209

δ-*(2-methyl-3-indolyl)valeric acid* [I: $R_1$ and $R_2$ are H; $R_3$ is $CH_3$; Alk' is $(CH_2)$] was prepared by hydrolyzing 15.2 g. (0.072 mole) of δ-(2-methyl-3-indolyl)valeronitrile in a solution of 100 ml. of 20% potassium-hydroxide and 100 ml. of ethanol using the manipulative procedure described above in Example 208. The final product was purified by recrystallization from methanol-water to give 9.2 g. of δ-(2-methyl-3-indolyl)valeric acid.

The intermediate δ-(2-methyl-3-indolyl)valeronitrile in turn was prepared using 32.8 g. (0.25 mole) of 2-methylindole, 7.3 g. (0.30 mole) of magnesium turnings, 38.3 g. (0.27 mole) of methyl iodide and 40.5 g. (0.25 mole) of δ-bromovaleronitrile in the manipulative procedure described above in Example 208. The crude product was purified by distillation in vacuo, the fraction boiling at 158–160° C./0.001 mm. being collected as product.

EXAMPLE 210

β-*(2,5-dicarboxy-3-indolyl)propionic acid* [I: $R_1$ and $R_3$ are COOH; $R_2$ is H; Alk' is $CH_2CH$] was isolated as a side product from the hydrolysis of ethyl β(2-carbethoxy-5-trifluoromethyl-3-indolyl)propionate prepared as an intermediate in Example 195. The product was recrystallized from dilute ethanol to give material of M.P. 293.6–294.2° C.

The compounds of Formulas Ia, b, and c have been shown to possess hypotensive, sedative, anti-inflammatory, monoamine oxidase inhibitory, coronary dilator, adrenolytic, tranquilizing, and anti-bacterial activities. As representative of these various activities shown by the compounds of the invention are the following:

The minimum effective hypotensive dose (MEHD) of 3 - [2 - (4-isopropylidenehydrazono-1-piperidyl)ethyl]indole, prepared above in Example 23, and 3-{3-[4-(N-ethylaminomethyl) - 1-piperidyl]propyl}indole dihydrochloride, prepared above in Example 107, each administered subcutaneously in the renal hypertensive rat, was found in each case to be 1.0 mg./kg., while the MEHD of 3 - [2-(4-isopropylhydrazido-1-piperidyl)-ethyl]indole, 3 - [3-(2-hydrazido-1-piperidyl)ethyl]indole, and 1-{3-[4-(N - ethylamino)-1-piperidyl]propyl}indole dihydrochloride, prepared in Examples 24, 25, and 112, respectively, was found in each case to be 1.0 mg./kg. on subcutaneous administration in the rat as determined using the photoelectric tensometer foot method.

Sedative activity was determined by the potentiation of hexobarbital induced sleeping time in mice. The effective dose, $ED_{50}$, of 3-{2-[4-(N,N-diethylcarbamyl)-1-piperidyl] - ethyl}indole, 3 - [3-(2-hydrazido-1-piperidyl)-ethyl]indole, 3 - {2 - [4-(N-ethylaminomethyl)-1-piperidyl]ethyl}indole dihydrochloride, 3-[3-(4-aminomethyl-1-piperidyl)propyl]indole, and 3 - {3-[4-(N-ethylaminomethyl) - 1 - pieridyl]propyl}indole dihydrochloride, prepard above in Examples 9, 25, 27, 106, and 107, respectively, in inducing sleep in mice to which 40 mg./kg. of hexobarbital had been administered was found to be, respectively, 25 mg./kg.; 50±22 mg./kg.; 114±20.4 mg./kg.; 30±5 mg./kg.; and 106±25.4 mg./kg., all determined intraperitoneally.

3 - [2 - (4 - aminocarbamyl-1-piperidyl)ethyl]indole; 3 - [2 - (4 - isopropylidenehydrazono-1-piperidyl)ethyl]indole; and 1 {3-[4-(N,N-diethylaminomethyl)-1-piperidyl]propyl}indole, prepared in Examples 22, 23, and 108, respectively, were each found to be about 10% as active as iproniazid as a monoamine oxidase inhibiting agent, while 1 - [3 - (4-cyclohexylmethyl-1-piperidyl)propyl]-2-methylindole, prepared above in Examples 123 and 125, respectively, were found to be 25% as active as iproniazid, and 3 - [3 - (4-cyclohexylmethyl-1-piperidyl)-1-propenyl]indole, prepared above in Example 138, was found to be 40% as active as iproniazid.

3 - {2 - [4-(N-ethylaminomethyl)-1-piperidyl]ethyl}indole dihydrochloride; 3 - [3-(4-aminomethyl-1-piperidyl)-propyl]indole; and 3 - {3-[4-(N-ethylaminomethyl)-1-piperidyl]propyl}indole dihydrochloride, prepared above in Examples 27, 106, and 107, respectively, administered intraperitoneally, produced tranquilization of mice as evidenced by the reaction of the mice to being touched lightly on the vibrissae. The effective dose $ED_{50}$, in producing tranquilization in mice was found to be, respectively, 110±62 mg./kg.; 42±917 mg./kg.; 130±24 mg./kg.

3 - {3 - [4-(N-methylcarbamyl)-1-piperidyl]propyl}indole; 3 - {3 - [4-(N-ethylcarbamyl)1-piperidyl]propyl}indole; and 3-[3-(4-benzyl-piperidyl)propyl]indole, prepared above in Examples 10, 11 and 121, respectively, were found to be three fourths, one-fifth, and slightly more active, respectively, than asprin as a mild analgesic.

The minimum effective dose of 3-[4-(4-cyclohexylmethyl-1-piperidyl)butyl]indole, prepared above in Example 117, as an anti-inflammatory agent in the granuloma pouch test was 1.56 mg./kg. (subcutaneously) and 25 mg./kg. (subcutaneously) in the lung inflammation test.

I claim:
1. A compound of the formula

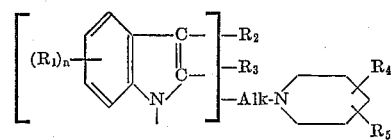

where any one of the three free valences on the indole ring is taken up by the 1-[lower-alkyl]piperidine group and the valences at the 1- and 2-positions, when not taken up by the 1-[lower-alkyl]piperidine group, are taken up by the groups $R_2$ and $R_3$, respectively; and where $R_1$ is from one to two members of the group consisting of hydrogen, hydroxy, halogen, lower-alkoxy, methylenedioxy, lower-alkylmercapto, lower-alkylsulfonyl, lower-alkyl, trifluoromethyl, benzyloxy, and benzylthio; $R_2$ is a member of the group consisting of hydrogen, lower-alkyl, and monocarbocyclic aryl-lower-alkyl; $R_3$ is a member of the group consisting of hydrogen, lower-alkyl, and monocarbocyclic aryl; $R_4$ is a member of the group consisting of hydrogen and from one to five lower-alkyls; $R_5$ is a member of the group consisting of cycloalkyl, cycloalkyl-lower-alkyl, monocarbocyclic aryl-lower-alkyl, carbo-lower - alkoxy, unsubstituted - carbamyl, N - lower-alkylcarbamyl, N-lower-alkenylcarbamyl, N,N-di-lower-alkylcarbamyl, N,N-di-lower-alkenylcarbamyl, aminocarbamyl, N-lower-alkylaminocarbamyl, N-lower-alkylidenehydrazono, aminomethyl, N-lower-alkylaminomethyl, N-lower - alkenylaminomethyl, N,N - di - lower-alkylaminomethyl, N,N - di - lower - alkenylaminomethyl, N-lower-alkylamino, N,N - di-lower - alkylamino, N,N - di - lower-alkenylamino, and lower-alkanoylamino; Alk is a member of the group consisting of lower-alkylene, lower-alkenylene, and lower-alkynylene, said lower-alkylene group containing from two to seven carbon atoms and interposing from two to six carbon atoms between the indolyl group and the nitrogen atom of the piperidine ring and said lower-alkenylene and lower-alkynylene groups interposing from three to four carbon atoms between the indolyl group and the nitrogen atom of the piperidine ring; $n$ is the integers 1 and 2; and where cycloalkyl, every occurrence, contains from five to seven ring carbon atoms in the cycloalkyl moiety and where monocarbocyclic aryl, every occurrence, is phenyl or phenyl substituted by halogen, lower-alkyl, hydroxy, lower-alkoxy, methylenedioxy, lower-alkylmercapto, lower-alkylsulfinyl, or lower-alkylsulfonyl.

2. A compound of the formua

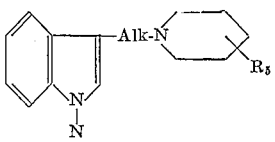

wherein $R_5$ is cycloalkyl-lower-alkyl containing from five to seven ring carbon atoms in the cycloalkyl moiety and Alk is lower-alkylene containing from two to seven carbon atoms and interposing from two to six carbon atoms between the indolyl group and the nitrogen atom of the piperidine ring.

3. A compound of the formula

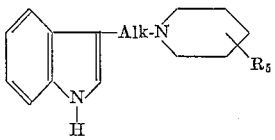

wherein $R_5$ is monocarbocyclic aryl-lower-alkyl, Alk is lower-alkylene containing from two to seven carbon atoms and interposing from two to six carbon atoms between the indolyl group and the nitrogen atom of the piperidine ring, and wherein monocarbocyclic aryl is phenyl or phenyl substituted by halogen, lower-alkyl, hydroxy, lower-alkoxy, methylenedioxy, lower-alkylmercapto, lower-alkylsulfinyl, or lower-alkylsulfonyl.

4. A compound of the formula

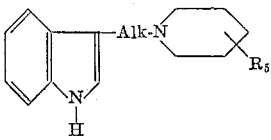

wherein $R_5$ is aminocarbamyl and Alk is lower-alkylene containing from two to seven carbon atoms and interposing from two to six carbon atoms between the indolyl group and the nitrogen atom of the piperidine ring.

5. A compound of the formula

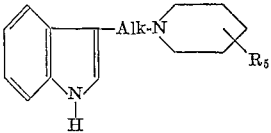

where $R_5$ is N,N-di-lower-alkylcarbamyl and Alk is lower-alkylene containing from two to seven carbon atoms and interposing from two to six carbon atoms between the indolyl group and the nitrogen atom of the piperidine ring.

6. A compound of the formula

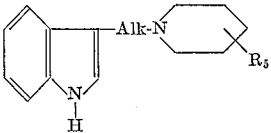

where $R_5$ is N-lower-alkylidenehydrazono and Alk is lower-alkylene containing from two to seven carbon atoms and interposing from two to six carbon atoms between the indolyl group and the nitrogen atom of the piperidine ring.

7. A compound of the formula

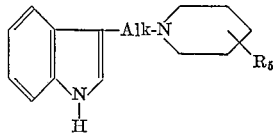

where $R_5$ is N-lower-alkylcarbamyl and Alk is lower-alkylene containing from two to seven carbon atoms and interposing from two to six carbon atoms between the indolyl group and the nitrogen atom of the piperidine ring.

8. A compound of the formula

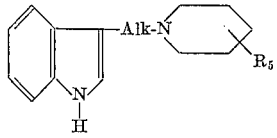

where $R_5$ is aminomethyl and Alk is lower-alkylene containing from two to seven carbon atoms and interposing from two to six carbon atoms between the indolyl group and the nitrogen atom of the piperidine ring.

9. A compound of the formula

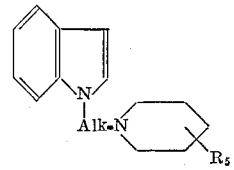

where $R_5$ is N-lower-alkylamino and Alk is lower-alkylene containing from two to seven carbon atoms and interposing from two to six carbon atoms between the indolyl group and the nitrogen atom of the piperidine ring.

10. 3-[4-(4-cyclohexylmethyl-1-piperidyl)butyl]indole.
11. 3 - [3 - (4 - cyclohexylmethyl-1-piperidyl)propyl]indole.
12. 3-[3-(4-benzyl-1-piperidyl)propyl]indole.
13. 3-[3-(4-aminomethyl-1-piperidyl)propyl]indole.
14. 3 - {4-[4-(N-methylcarbamyl)-1-piperidyl]propyl}-indole.
15. 3-[2-(2-aminocarbamyl-1-piperidyl)ethyl]indole.
16. 3 - {2 - [4 - (N,N - diethylcarbamyl)-1-piperidyl]-ethyl}indole.
17. 3 - [2 - (4 - isopropylidenehydrazono-1-piperidyl)-ethyl]indole.
18. 3 - {2 - [4-(N-isopropylaminocarbamyl)-1-piperidyl]ethyl}-indole.
19. 3 - {3 - [4 - (N - ethylaminomethyl)-1-piperidyl]-propyl}indole dihydrochloride.
20. 1 - {3 - [4-(N-ethylamino)-1-piperidyl]propyl}-indole.

References Cited by the Examiner
UNITED STATES PATENTS

| | | | |
|---|---|---|---|
| 2,708,197 | 5/1955 | Speeter | 260—294.7 |
| 3,014,043 | 12/1961 | Gaines et al. | 260—294.7 |
| 3,075,986 | 1/1963 | Jacob et al. | 260—294.7 |
| 3,155,668 | 11/1964 | Albertson | 260—31 |

WALTER A. MODANCE, *Primary Examiner.*

JOHN D. RANDOLPH, *Examiner.*

A. D. SPEVACK, *Assistant Examiner.*